United States Patent
Persico et al.

(10) Patent No.: US 9,026,070 B2
(45) Date of Patent: May 5, 2015

(54) LOW-POWER WIRELESS DIVERSITY RECEIVER WITH MULTIPLE RECEIVE PATHS

(75) Inventors: Charles J. Persico, Rancho Santa Fe, CA (US); Kevin Gard, Raleigh, NC (US); Gurkanwal Kamal Sahota, San Diego, CA (US); Shinichi Miyazaki, San Diego, CA (US); Steven C. Ciccarelli, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1608 days.

(21) Appl. No.: 10/993,011

(22) Filed: Nov. 18, 2004

(65) Prior Publication Data

US 2006/0009177 A1   Jan. 12, 2006

Related U.S. Application Data

(60) Provisional application No. 60/531,241, filed on Dec. 18, 2003.

(51) Int. Cl.
*H04B 17/02* (2006.01)
*H04K 3/00* (2006.01)
(Continued)

(52) U.S. Cl.
CPC ............... *H04K 3/224* (2013.01); *H04B 1/109* (2013.01); *H04B 7/082* (2013.01)

(58) Field of Classification Search
CPC ................................. H01Q 21/28; H04L 1/06
USPC ........... 455/132, 424, 425, 456.5, 456.6, 561, 455/550.1, 575.1, 65, 63.1, 67.11, 506, 501, 455/67.13, 168.1, 277.2, 334, 273, 275, 455/278.1, 276.1, 138, 139, 562.1, 134, 455/135, 343.2, 436, 213, 277.1; 370/343, 370/516, 208; 375/347, 343, 316, 349, 267
See application file for complete search history.

(56) References Cited

U.S. PATENT DOCUMENTS 3,911,364 A * 10/1975 Langseth et al. ............... 375/267
4,035,728 A * 7/1977 Ishikawa et al. ............... 455/134
(Continued)

FOREIGN PATENT DOCUMENTS

CN    1523912 A    8/2004
CN    1922795 A    2/2007
(Continued)

OTHER PUBLICATIONS

Aparin et al., "A Highly-integrated tri-band/quad-mode SiGe BiCMOS RF-to-baseband and receiver for wireless CDMA/WCDMA/AMPS applications with GPS capability", Solid-State Circuits Conference, 2002. Digest of Technical Papers. 2002 IEEE International Feb. 3-7, 2002, Piscataway, NJ, USA, IEEE, vol. 1, 2002, pp. 234-235, XP010585547, ISBN: 0-7803-7335-9.
(Continued)

*Primary Examiner* — Lee Nguyen
(74) *Attorney, Agent, or Firm* — Ramin Mobarhan

(57) ABSTRACT

A low-power diversity receiver includes at least two receive paths, each of which is designated as a primary or secondary receive path. A primary receive path is compliant with system requirements (e.g., IS-98D requirements). A secondary receive path is not fully compliant with the system requirements and is designed for lower power, less area, and lower cost than the primary receive path. For a multi-antenna receiver, the two receive paths may be used to simultaneously process two received signals from two antennas. For a single-antenna receiver, either the primary or secondary receive path is selected, e.g., depending on whether or not large amplitude "jammers" are detected, to process a single input signal from one antenna. The receiver may include additional receive paths for additional frequency bands and/or GPS.

34 Claims, 10 Drawing Sheets

(51) Int. Cl.
*H04B 1/10* (2006.01)
*H04B 7/08* (2006.01)
*H04B 1/16* (2006.01)

(56) References Cited

U.S. PATENT DOCUMENTS

| | | | | |
|---|---|---|---|---|
| 4,035,729 A * | 7/1977 | Perry | ............................ | 455/135 |
| 4,246,655 A * | 1/1981 | Parker | ........................... | 455/135 |
| 4,326,294 A * | 4/1982 | Okamoto et al. | ............ | 455/139 |
| 4,715,048 A * | 12/1987 | Masamura | .................... | 375/347 |
| 4,742,563 A * | 5/1988 | Fukumura | .................... | 455/132 |
| 4,756,023 A * | 7/1988 | Kojima | ......................... | 455/134 |
| 4,969,207 A * | 11/1990 | Sakamoto et al. | ............ | 455/134 |
| 5,056,411 A * | 10/1991 | Baker | ........................... | 89/41.22 |
| 5,128,630 A | 7/1992 | Mijuskovic | | |
| 5,291,519 A * | 3/1994 | Tsurumaru | ................... | 375/230 |
| 5,321,850 A * | 6/1994 | Backstrom et al. | ........... | 455/139 |
| 5,345,601 A * | 9/1994 | Takagi et al. | .................... | 455/59 |
| 5,390,342 A * | 2/1995 | Takayama et al. | ............ | 455/134 |
| 5,559,838 A * | 9/1996 | Nakagoshi | ................... | 375/347 |
| 5,566,364 A * | 10/1996 | Mizoguchi et al. | ........... | 455/132 |
| 5,694,396 A | 12/1997 | Firouzbakht et al. | | |
| 5,697,083 A * | 12/1997 | Sano | ........................ | 455/276.1 |
| 5,761,613 A | 6/1998 | Saunders et al. | | |
| 5,794,159 A | 8/1998 | Portin | | |
| 5,805,643 A * | 9/1998 | Seki et al. | ..................... | 375/347 |
| 5,805,989 A * | 9/1998 | Ushida | ....................... | 455/343.2 |
| 5,835,853 A | 11/1998 | Enoki et al. | | |
| 5,940,452 A | 8/1999 | Rich | | |
| 5,999,815 A * | 12/1999 | TenBrook et al. | ............. | 455/436 |
| 5,999,990 A | 12/1999 | Sharrit et al. | | |
| 6,026,288 A * | 2/2000 | Bronner | ..................... | 455/343.2 |
| 6,040,732 A | 3/2000 | Brokaw | | |
| 6,044,254 A * | 3/2000 | Ohta et al. | ..................... | 455/272 |
| 6,063,961 A * | 5/2000 | Kroner | .......................... | 564/138 |
| 6,069,923 A * | 5/2000 | Ostman et al. | ................ | 375/316 |
| 6,088,348 A * | 7/2000 | Bell et al. | ....................... | 370/343 |
| 6,208,844 B1 | 3/2001 | Abdelgany | | |
| 6,249,687 B1 | 6/2001 | Thomsen et al. | | |
| 6,424,683 B1 | 7/2002 | Schollhorn | | |
| 6,430,237 B1 * | 8/2002 | Anvari | .......................... | 375/343 |
| 6,472,947 B1 * | 10/2002 | Zeitz | ............................. | 333/17.1 |
| 6,473,601 B1 * | 10/2002 | Oda | ............................... | 455/132 |
| 6,522,895 B1 | 2/2003 | Montalvo | | |
| 6,535,725 B2 | 3/2003 | Hatcher et al. | | |
| 6,600,759 B1 * | 7/2003 | Wood | ........................... | 370/516 |
| 6,600,907 B1 * | 7/2003 | Taguchi | ........................ | 455/132 |
| 6,600,931 B2 | 7/2003 | Sutton et al. | | |
| 6,657,498 B2 | 12/2003 | Park et al. | | |
| 6,806,777 B2 | 10/2004 | Franca-Neto | | |
| 6,819,941 B2 | 11/2004 | Dening et al. | | |
| 6,888,888 B1 | 5/2005 | Tu et al. | | |
| 6,952,594 B2 | 10/2005 | Hendin | | |
| 6,954,446 B2 | 10/2005 | Kuffner | | |
| 6,983,132 B2 * | 1/2006 | Woo et al. | ..................... | 455/103 |
| 6,985,712 B2 | 1/2006 | Yamakawa et al. | | |
| 6,987,950 B2 | 1/2006 | Coan | | |
| 7,013,166 B2 | 3/2006 | Clifford | | |
| 7,024,172 B1 | 4/2006 | Murphy et al. | | |
| 7,039,377 B2 | 5/2006 | Yates | | |
| 7,123,891 B2 | 10/2006 | Loke | | |
| 7,142,042 B1 | 11/2006 | Henry | | |
| 7,161,423 B2 | 1/2007 | Paul et al. | | |
| 7,167,044 B2 | 1/2007 | Li et al. | | |
| 7,187,239 B2 | 3/2007 | Yeh | | |
| 7,187,735 B2 * | 3/2007 | Kent et al. | ..................... | 333/193 |
| 7,187,904 B2 | 3/2007 | Gainey et al. | | |
| 7,212,788 B2 | 5/2007 | Weber et al. | | |
| 7,224,231 B2 | 5/2007 | Wu | | |
| 7,260,377 B2 | 8/2007 | Burns et al. | | |
| 7,283,851 B2 | 10/2007 | Persico et al. | | |
| 7,299,021 B2 * | 11/2007 | P rssinen et al. | ............. | 455/226.1 |
| 7,313,368 B2 | 12/2007 | Wu et al. | | |
| 7,317,894 B2 | 1/2008 | Hirose | | |
| 7,333,831 B2 | 2/2008 | Srinivasan et al. | | |
| 7,356,325 B2 | 4/2008 | Behzad et al. | | |
| 7,403,508 B1 | 7/2008 | Miao | | |
| 7,444,166 B2 | 10/2008 | Sahota | | |
| 7,454,181 B2 | 11/2008 | Banister et al. | | |
| 7,477,106 B2 | 1/2009 | Van Bezooijen et al. | | |
| 7,599,675 B2 | 10/2009 | Mu et al. | | |
| 7,643,847 B2 | 1/2010 | Daanen et al. | | |
| 7,643,848 B2 | 1/2010 | Robinett | | |
| 7,697,905 B2 | 4/2010 | Lee et al. | | |
| 7,728,664 B2 | 6/2010 | Chang et al. | | |
| 7,751,513 B2 | 7/2010 | Eisenhut et al. | | |
| 7,764,726 B2 | 7/2010 | Simic et al. | | |
| 7,848,724 B2 | 12/2010 | Bult et al. | | |
| 7,869,528 B2 | 1/2011 | Robinson | | |
| 7,877,075 B1 | 1/2011 | Jin et al. | | |
| 7,911,269 B2 | 3/2011 | Yang et al. | | |
| 7,944,298 B2 | 5/2011 | Cabanillas et al. | | |
| 7,949,309 B2 | 5/2011 | Rofougaran et al. | | |
| 7,952,398 B2 | 5/2011 | Salcido et al. | | |
| 8,022,772 B2 | 9/2011 | Cassia et al. | | |
| 8,055,229 B2 | 11/2011 | Huang | | |
| 8,063,706 B2 | 11/2011 | Li et al. | | |
| 8,081,672 B2 | 12/2011 | Kent et al. | | |
| 8,090,332 B2 | 1/2012 | Sahota et al. | | |
| 8,090,369 B2 | 1/2012 | Kitazoe | | |
| 8,139,670 B1 | 3/2012 | Son et al. | | |
| 8,149,955 B2 | 4/2012 | Tired | | |
| 8,195,117 B2 | 6/2012 | Bult et al. | | |
| 8,208,887 B2 | 6/2012 | Lee et al. | | |
| 8,217,723 B2 | 7/2012 | Rajendran et al. | | |
| 8,242,841 B2 | 8/2012 | Zhang | | |
| 8,270,927 B2 | 9/2012 | Wallace et al. | | |
| 8,290,449 B2 | 10/2012 | Keehr et al. | | |
| 8,295,778 B2 | 10/2012 | Kotecha et al. | | |
| 8,306,494 B2 | 11/2012 | Ojo | | |
| 8,442,473 B1 | 5/2013 | Kaukovuori et al. | | |
| 8,514,015 B2 | 8/2013 | Chen | | |
| 8,600,315 B2 | 12/2013 | Roufoogaran et al. | | |
| 8,626,084 B2 | 1/2014 | Chan et al. | | |
| 8,676,148 B2 | 3/2014 | Ogasawara | | |
| 8,706,069 B2 | 4/2014 | Khoini-Poorfard et al. | | |
| 2002/0008575 A1 | 1/2002 | Oskowsky et al. | | |
| 2002/0061773 A1 | 5/2002 | Adachi et al. | | |
| 2002/0111163 A1 | 8/2002 | Hamabe | | |
| 2002/0132597 A1 * | 9/2002 | Peterzell et al. | ............... | 455/130 |
| 2002/0173337 A1 | 11/2002 | Hajimiri et al. | | |
| 2002/0193108 A1 | 12/2002 | Robinett | | |
| 2003/0076797 A1 | 4/2003 | Lozano | | |
| 2003/0081694 A1 | 5/2003 | Wieck | | |
| 2003/0125040 A1 | 7/2003 | Walton et al. | | |
| 2003/0148750 A1 | 8/2003 | Yan et al. | | |
| 2003/0157915 A1 | 8/2003 | Atkinson et al. | | |
| 2003/0176176 A1 | 9/2003 | Leinonen et al. | | |
| 2003/0203743 A1 * | 10/2003 | Sugar et al. | ................. | 455/550.1 |
| 2003/0206076 A1 | 11/2003 | Hashemi et al. | | |
| 2003/0228851 A1 | 12/2003 | Taniguchi | | |
| 2004/0087290 A1 * | 5/2004 | Schmidt et al. | ............... | 455/213 |
| 2004/0092243 A1 | 5/2004 | Hey-Shipton | | |
| 2004/0113746 A1 | 6/2004 | Brindle | | |
| 2004/0116086 A1 * | 6/2004 | Huttunen | ....................... | 455/130 |
| 2004/0121753 A1 | 6/2004 | Sugar et al. | | |
| 2004/0204104 A1 | 10/2004 | Horng et al. | | |
| 2004/0219959 A1 * | 11/2004 | Khayrallah et al. | ........ | 455/575.7 |
| 2004/0224643 A1 | 11/2004 | Nakai | | |
| 2004/0253955 A1 | 12/2004 | Love et al. | | |
| 2004/0266356 A1 * | 12/2004 | Javor et al. | .................. | 455/67.11 |
| 2005/0039060 A1 | 2/2005 | Okayasu | | |
| 2005/0075077 A1 * | 4/2005 | Mach et al. | .................. | 455/67.13 |
| 2005/0079847 A1 | 4/2005 | Arafa | | |
| 2005/0118977 A1 | 6/2005 | Drogi et al. | | |
| 2005/0197090 A1 | 9/2005 | Stockstad et al. | | |
| 2005/0215264 A1 | 9/2005 | Subramaniam et al. | | |
| 2005/0231290 A1 | 10/2005 | Hung et al. | | |
| 2005/0265084 A1 | 12/2005 | Choi | | |
| 2005/0277387 A1 | 12/2005 | Kojima et al. | | |
| 2006/0061773 A1 * | 3/2006 | Lee et al. | ....................... | 356/511 |
| 2006/0121937 A1 | 6/2006 | Son | | |
| 2006/0128322 A1 | 6/2006 | Igarashi et al. | | |
| 2006/0146693 A1 * | 7/2006 | Mori et al. | ..................... | 370/208 |

(56) References Cited

U.S. PATENT DOCUMENTS

| | | | |
|---|---|---|---|
| 2006/0170503 A1 | 8/2006 | Lee et al. |
| 2006/0189286 A1 | 8/2006 | Kyu et al. |
| 2006/0234662 A1 | 10/2006 | Diloisy |
| 2006/0291428 A1 | 12/2006 | Filipovic |
| 2007/0049332 A1 | 3/2007 | Higuchi |
| 2007/0060080 A1 | 3/2007 | Nishimura et al. |
| 2007/0072577 A1 | 3/2007 | Rozenblit et al. |
| 2007/0105517 A1 | 5/2007 | Chang et al. |
| 2007/0142013 A1 | 6/2007 | Bucknor et al. |
| 2007/0177656 A1 | 8/2007 | Maruta et al. |
| 2007/0177693 A1 | 8/2007 | Kluge |
| 2007/0184801 A1* | 8/2007 | Kogawa et al. ............ 455/277.1 |
| 2007/0197170 A1 | 8/2007 | Boos |
| 2007/0197178 A1 | 8/2007 | Gu |
| 2007/0197204 A1 | 8/2007 | Herczog et al. |
| 2007/0202890 A1 | 8/2007 | Feher |
| 2007/0242784 A1 | 10/2007 | Sampson et al. |
| 2007/0243832 A1 | 10/2007 | Park et al. |
| 2007/0262817 A1 | 11/2007 | Ciccarelli et al. |
| 2007/0262871 A1* | 11/2007 | Yamagajo et al. ......... 340/572.7 |
| 2008/0004078 A1* | 1/2008 | Barratt et al. ............. 455/562.1 |
| 2008/0013654 A1 | 1/2008 | Rick et al. |
| 2008/0116976 A1 | 5/2008 | Chang et al. |
| 2008/0117999 A1 | 5/2008 | Kadous et al. |
| 2008/0139151 A1 | 6/2008 | Ojo et al. |
| 2008/0204148 A1 | 8/2008 | Kim et al. |
| 2008/0224770 A1 | 9/2008 | Kim et al. |
| 2008/0224791 A1 | 9/2008 | Cheng |
| 2008/0225971 A1 | 9/2008 | Behzad |
| 2008/0261650 A1 | 10/2008 | Piriyapoksombut et al. |
| 2008/0297259 A1 | 12/2008 | Mu |
| 2009/0124227 A1 | 5/2009 | Ishiguro |
| 2009/0227214 A1 | 9/2009 | Georgantas et al. |
| 2009/0237161 A1 | 9/2009 | Fagg |
| 2009/0243869 A1 | 10/2009 | Sanderford, Jr. |
| 2009/0253456 A1 | 10/2009 | Toh et al. |
| 2009/0290659 A1 | 11/2009 | Petrovic et al. |
| 2009/0323779 A1 | 12/2009 | Lennen |
| 2010/0019970 A1 | 1/2010 | Farrokhi et al. |
| 2010/0034094 A1 | 2/2010 | Tenny |
| 2010/0040178 A1 | 2/2010 | Sutton et al. |
| 2010/0041359 A1 | 2/2010 | Liu et al. |
| 2010/0142440 A1 | 6/2010 | Inoue |
| 2010/0195754 A1 | 8/2010 | Li et al. |
| 2010/0197263 A1 | 8/2010 | Dwyer et al. |
| 2010/0210272 A1 | 8/2010 | Sundstrom et al. |
| 2010/0210299 A1 | 8/2010 | Gorbachov |
| 2010/0214184 A1 | 8/2010 | Tran et al. |
| 2010/0225414 A1 | 9/2010 | Gorbachov |
| 2010/0226327 A1 | 9/2010 | Zhang et al. |
| 2010/0232493 A1 | 9/2010 | Thirumoorthy |
| 2010/0237947 A1 | 9/2010 | Xiong et al. |
| 2010/0253435 A1 | 10/2010 | Ichitsubo et al. |
| 2010/0265875 A1 | 10/2010 | Zhao et al. |
| 2010/0271986 A1 | 10/2010 | Chen |
| 2010/0272051 A1 | 10/2010 | Fu et al. |
| 2010/0301946 A1 | 12/2010 | Borremans |
| 2010/0311378 A1 | 12/2010 | Tasic et al. |
| 2010/0328155 A1 | 12/2010 | Simic et al. |
| 2010/0330977 A1 | 12/2010 | Kadous et al. |
| 2011/0018635 A1 | 1/2011 | Tasic et al. |
| 2011/0044380 A1 | 2/2011 | Marra et al. |
| 2011/0050319 A1 | 3/2011 | Wong |
| 2011/0084791 A1 | 4/2011 | Mun et al. |
| 2011/0086603 A1 | 4/2011 | Toosi et al. |
| 2011/0110463 A1 | 5/2011 | Chang et al. |
| 2011/0122972 A1 | 5/2011 | Lie et al. |
| 2011/0165848 A1 | 7/2011 | Gorbachov et al. |
| 2011/0193625 A1 | 8/2011 | Gatta et al. |
| 2011/0211533 A1 | 9/2011 | Casaccia et al. |
| 2011/0217945 A1 | 9/2011 | Uehara et al. |
| 2011/0222443 A1 | 9/2011 | Khlat |
| 2011/0222444 A1 | 9/2011 | Khlat et al. |
| 2011/0242999 A1 | 10/2011 | Palanki et al. |
| 2011/0250926 A1 | 10/2011 | Wietfeldt et al. |
| 2011/0268048 A1 | 11/2011 | Toskala et al. |
| 2011/0268232 A1 | 11/2011 | Park et al. |
| 2011/0292844 A1 | 12/2011 | Kwun et al. |
| 2011/0299434 A1 | 12/2011 | Gudem et al. |
| 2011/0300810 A1 | 12/2011 | Mikhemar et al. |
| 2012/0009886 A1 | 1/2012 | Poulin |
| 2012/0013387 A1 | 1/2012 | Sankaranarayanan et al. |
| 2012/0026862 A1 | 2/2012 | Sadri et al. |
| 2012/0044927 A1 | 2/2012 | Pan et al. |
| 2012/0056681 A1 | 3/2012 | Lee |
| 2012/0057621 A1 | 3/2012 | Hong et al. |
| 2012/0195237 A1 | 8/2012 | Chan et al. |
| 2012/0236829 A1 | 9/2012 | Takano et al. |
| 2012/0293265 A1 | 11/2012 | Heikkinen et al. |
| 2012/0294299 A1 | 11/2012 | Fernando |
| 2012/0327825 A1 | 12/2012 | Gudem et al. |
| 2012/0329395 A1 | 12/2012 | Husted et al. |
| 2013/0003617 A1 | 1/2013 | Gudem et al. |
| 2013/0003783 A1 | 1/2013 | Gudem et al. |
| 2013/0043946 A1 | 2/2013 | Hadjichristos et al. |
| 2013/0051284 A1 | 2/2013 | Khlat |
| 2013/0114769 A1 | 5/2013 | Fernando |
| 2013/0217398 A1 | 8/2013 | Winiecki et al. |
| 2013/0230080 A1 | 9/2013 | Gudem et al. |
| 2013/0231064 A1 | 9/2013 | Gudem et al. |
| 2013/0265892 A1 | 10/2013 | Fernando |
| 2013/0315348 A1 | 11/2013 | Tasic et al. |
| 2013/0316668 A1 | 11/2013 | Davierwalla et al. |
| 2013/0316669 A1 | 11/2013 | Davierwalla et al. |
| 2013/0316670 A1 | 11/2013 | Tasic et al. |
| 2013/0329665 A1 | 12/2013 | Kadous et al. |
| 2014/0072001 A1 | 3/2014 | Chang et al. |
| 2014/0113578 A1 | 4/2014 | Xu |
| 2014/0269853 A1 | 9/2014 | Gudem et al. |

FOREIGN PATENT DOCUMENTS

| | | | |
|---|---|---|---|
| CN | 101523967 A | | 9/2009 |
| CN | 101789805 A | | 7/2010 |
| EP | 1164719 A1 | | 12/2001 |
| EP | 1370012 | | 12/2003 |
| EP | 1398887 A1 | | 3/2004 |
| EP | 1708372 A2 | | 10/2006 |
| EP | 1726098 A1 | | 11/2006 |
| EP | 1748567 A2 | | 1/2007 |
| EP | 1761076 A2 | | 3/2007 |
| EP | 2068583 A1 | | 6/2009 |
| EP | 2141818 A1 | | 1/2010 |
| EP | 1916767 B1 | | 12/2010 |
| EP | 2393205 A2 | | 12/2011 |
| EP | 2398285 A1 | | 12/2011 |
| GB | 2472978 A | | 3/2011 |
| JP | 05-227234 | * | 9/1993 |
| JP | H0730452 A | | 1/1995 |
| JP | 07221684 | | 8/1995 |
| JP | 09-027778 | * | 1/1997 |
| JP | 09116458 | | 5/1997 |
| JP | H11127300 A | | 5/1999 |
| JP | 2000013278 A | | 1/2000 |
| JP | 2001285114 | | 10/2001 |
| JP | 2002261880 A | | 9/2002 |
| JP | 2004015162 A | | 1/2004 |
| JP | 2007324711 A | | 12/2007 |
| JP | 2008519535 A | | 6/2008 |
| JP | 2009130867 A | | 6/2009 |
| JP | 2011015112 A | | 1/2011 |
| JP | 2011082669 A | | 4/2011 |
| JP | 2011119807 A | | 6/2011 |
| WO | WO 0150636 | | 7/2001 |
| WO | WO0150636 | | 7/2001 |
| WO | WO 2005039060 | | 4/2005 |
| WO | WO2005039060 | | 4/2005 |
| WO | WO 2005064816 A1 | | 7/2005 |
| WO | WO2005064816 A1 | | 7/2005 |
| WO | 2005088847 A1 | | 9/2005 |
| WO | WO2005104389 A1 | | 11/2005 |
| WO | 2006050515 A2 | | 5/2006 |
| WO | 2006118538 A2 | | 11/2006 |
| WO | 2008084539 A1 | | 7/2008 |

(56) References Cited

FOREIGN PATENT DOCUMENTS

| WO | 2008103757 | 8/2008 |
| WO | WO2008092745 A1 | 8/2008 |
| WO | 2008145604 A1 | 12/2008 |
| WO | 2010059257 A1 | 5/2010 |
| WO | 2011019850 A1 | 2/2011 |
| WO | WO2011050729 A1 | 5/2011 |
| WO | WO2011092005 A1 | 8/2011 |
| WO | 2011138697 A1 | 11/2011 |
| WO | 2012008705 A2 | 1/2012 |
| WO | 2012049529 A1 | 4/2012 |
| WO | 2012158976 A1 | 11/2012 |
| WO | 2013036794 A1 | 3/2013 |
| WO | 2013131047 | 9/2013 |

OTHER PUBLICATIONS

International Search Report and Written Opinion—PCT/US2004/042783, International Search Authority—European Patent Office—Apr. 26, 2005.

Hwang, et al., "A High IIP2 Direct-Conversion Receiver using Even-Harmonic Reduction Technique for Cellular CDMA/PCS/GPS applications," IEEE Transaction on Circuits and Systems.

MSM6000 Chipset Solution, Qualcomm Incorporated.

MSM6500 Chipset Solution, Qualcomm Incorporated.

3GPP TS 36.101 V11.0.0, 3rd Generation Partnership Project; Technical Specification Group Radio Access Network; Evolved Universal Terrestrial Radio Access (E-UTRA); User Equipment (UE) radio transmission and reception (Release 11), Mar. 2012.

Broyde, et al., "The Noise Performance of a Multiple-Input-Port and Multiple-Output-Port Low-Noise Amplifier Connected to an Array of Coupled Antennas," International Journal of Antennas and Propagation, vol. 2011, Article ID 438478, Jul. 18, 2011, 12 pages.

Chen, et al, "A 5-6 GHz 1-V CMOS Direct-Conversion Receiver With an Integrated Quadrature Coupler," IEEE Journal of Solid-State Circuits, vol. 42, No. 9, 2007, pp. 1963-1975.

Chen, et al., "A monolithic 5.9-GHz CMOS I/Q direct-down converter utilizing a quadrature coupler and transformer-coupled subharmonic mixers," Microwave and Wireless Components Letters, IEEE , vol. 16, No. 4, 2006, pp. 197-199.

Garuda, et al., "A Multi-band CMOS RF Front-end for 4G WiMAX and WLAN Applications," 2006 IEEE International Symposium on Circuits and Systes, 2006. ISCAS 2006. May 2006, 4 pages.

Hashemi, et al., "Concurrent Multiband Low-Noise Amplifiers—Theory, Design, and Applications," IEEE Transactions on Microwave Theory and Techniques, vol. 50, No. 1, Jan. 2002.

Henrik M et al., "A Full Duplex Front End Module for WiFi 802.11.n Applications", European Microwave Association, vol. 12, No. 4, Oct. 2008, pp. 162-165.

Jussi R et al., "A Dual-Band RF Front-End for WCDMA and GSM Applications", IEEE, Journal Solid-State Circuits, 2001, vol. 36, No. 8, pp. 1198-1204.

Kim, T.W., et al., Highly Linear Receiver Front-End Adopting MOSFET Transconductance Linearization by Multiple Gated Transistors, IEEE Journal of Solid-State Circuits, United States, IEEE, Jan. 1, 2004, vol. 39, No. 1, pp. 223-229.

Lee et al., "Development of Miniature Quad SAW filter bank based on PCB substrate", IEEE Intl Frequency Control Symp, pp. 146-149, 2007.

Pitschi M. et al., "High Performance Microwave Acoustic Components for Mobile Radios", Ultrasonics Symposium (IUS), 2009 IEEE International, EPCOS AG, Munich, Germany, vol. 1, Sep. 20-23, 2009.

Tasic A. et al., "Design of Adaptive Multimode RF Front-End Circuits", IEEE Journal of Solid-State Circuits, vol. 42, Issue 2, Feb. 2007 pp. 313-322.

Sever et al. "A Dual-Antenna Phase-Array Ultra-Wideband CMOS Transceiver". IEEE Communications Magazine [Online] 2006, vol. 44, Issue 8, pp. 102-110. See pp. 104-107.

Winternitz, et al., "A GPS Receiver for High-Altitude Satellite Navigation," IEEE Journal of Selected Topics in Signal Processing, vol. 3, No. 4, pp. 541-556, Aug. 2009.

Jones W. W., et al., "Narrowband interference suppression using filter-bank analysis/synthesis techniques", Military Communications Conference, 1992, Milcom '92, Conference Rec0r D. Communications—Fusing Command, Control and Intellegence. IEEE San Diego, CA, USA, 11 14 Oct. 1992, New York, NY, USA, IEEE, US, Oct. 11, 1992, pp. 898-902, XP010060840, DOI: 10.1109/MILCOM.1992.243977, ISBN: 978-0-7803-0585-4.

Lai, C.M., et al., "Compact router transceiver architecture for carrier aggregation systems", Microwave Conference (EUMC), 2011 41st European, IEEE, Oct. 10, 2011, pp. 693-696, XP032072825, ISBN: 978-1-61284-235-6 the whole document.

Qualcomm Europe: "UE Implementation Impact due to 4C-HSDPA Operation", 3GPP Draft; R1-094067_UE_IMPL_Impact_4C_HSDPA, 3rd Generation Partnership Project (3GPP). Mobile Competence Centre; 650, Route des Luci0les; F-06921 Sophia-Antipolis Cedex; France, no. Miyazaki; 20091012, Oct. 12, 2009, XP050388547, [retrieved on Oct. 6, 2009].

Rahn D.G., et al., "A fully integrated multiband MIMO WLAN transceiver RFIC, " IEEE J. Solid-State Circuits, 2005, vol. 40 (8), 1629-1641.

Philips: "Capabilities of multi-transceiver UES", 3GPP Draft; R1-103913, 3rd Generation Partnership Project (3GPP), Mobile Competence Centrel; 650, Route des Lucioles; F-06921 Sophia-Antipolis Cedex; France, vol. RAN WG1, no. Dresden, Germany; Jun. 28, 2010, Jun. 22, 2010, XP050449298, [retrieved on Jun. 22, 2010] the whole document.

Hwang, et al., "A High IIP2 Direct-Conversion Receiver using Even-Harmonic Reduction Technique for Cellular CDMA/PCS/GPS applications," IEEE Transaction on Circuits and Systems, 2008.

Kevin W et al., "3G/4G Multimode Cellular Front End Challenges", Part 2: Architecture Discussion, RFMD® White Paper, 2009, 9 pages.

MSM6000 Chipset Solution, Qualcomm Incorporated, 2003.

MSM6500 Chipset Solution, Qualcomm Incorporated, 2004.

"UMTS Picocell Front End Module", CTS Corp., 2007, 8 pages.

\* cited by examiner

LOW-POWER WIRELESS DIVERSITY RECEIVER WITH MULTIPLE RECEIVE PATHS

The present application for patent claims priority to Provisional Application No. 60/531,241, entitled "Low-Power Wireless Diversity Receiver with Multiple Receive Paths" filed Dec. 18, 2003, and assigned to the assignee hereof and hereby expressly incorporated by reference herein.

BACKGROUND

I. Field

The present invention relates generally to electronics, and more specifically to a diversity receiver for wireless communication.

II. Background

In a wireless communication system, a transmitter modulates data onto a radio frequency (RF) carrier signal to generate an RF modulated signal that is more suitable for transmission. The transmitter then transmits the RF modulated signal via a wireless channel to a receiver. The transmitted signal may reach the receiver via one or more propagation paths (e.g., a line-of-sight path and/or reflected paths). The characteristics of the propagation paths may vary over time due to various phenomena such as fading and multipath. Consequently, the transmitted signal may experience different channel conditions and may be received with different amplitudes and/or phases over time.

To provide diversity against deleterious path effects, multiple antennas may be used to receive the RF modulated signal. At least one propagation path typically exists between the transmit antenna and each of the receive antennas. If the propagation paths for different receive antennas are independent, which is generally true to at least an extent, then diversity increases and the received signal quality improves when multiple antennas are used to receive the RF modulated signal.

A multi-antenna receiver conventionally has one RF receiver processing path (or simply, "receive path") for each receive antenna. Each receive path includes various circuit blocks (e.g., amplifiers, filters, mixers, and so on) used to condition and process a received signal from an associated antenna. The circuit blocks are designed to meet various system requirements such as linearity, dynamic range, sensitivity, out-of-band rejection, and so on, as is known in the art. In conventional diversity receiver designs, the receive path is typically replicated for each receive antenna. The replication of the receive paths with identical circuitry results in higher power consumption, larger area, and higher cost for the multi-antenna receiver, all of which are undesirable. For a portable wireless device, the higher power consumption adversely impacts standby time and reduces talk time between battery recharges.

There is therefore a need in the art for a low-power diversity receiver.

SUMMARY

A low-power diversity receiver having good performance is described herein. The diversity receiver includes two or more receive paths, each of which is designated as a primary or secondary receive path. A primary receive path is compliant with applicable system requirements (e.g., IS-98D, cdma2000, GSM and/or W-CDMA requirements). A secondary receive path is designed for low power but is not fully compliant with the system requirements. For example, the secondary receive path may be designed to meet requirements for dynamic range and sensitivity but not for certain out-of-band rejection of large amplitude "jammers", which are undesired signals outside of the RF channel of interest. The relaxed requirements allow the secondary receive path to be implemented with lower power consumption, less area, and lower cost. The second receive path can provide good performance under most operating conditions. For a multi-antenna receiver, the primary and secondary receive paths may be used to simultaneously process two received signals from two antennas. For a single-antenna receiver, either the primary or secondary receive path may be selected, e.g., depending on whether or not jammers are detected, to process a single received signal from one antenna.

In an exemplary embodiment, a wireless device with two receive paths for one frequency band is described. The first (primary) receive path includes (1) a first amplifier that amplifies a first input signal and provides a first amplified signal and (2) a first downconverter that translates the first amplified signal in frequency (e.g., from RF down to baseband) and provides a first baseband signal. The second (secondary) receive path includes (1) a second amplifier that amplifies a second input signal and provides a second amplified signal and (2) a second downconverter that translates the second amplified signal in frequency and provides a second baseband signal. The first receive path is compliant with system requirements, and the second receive path is non-compliant with some or all of the system requirements. A jammer detector detects for the presence of large amplitude jammers in the first and/or second input signal. If only one receive path is needed, then the first receive path is selected if jammers are detected and the second receive path is selected for use if jammers are not detected. The wireless device may include additional receive paths for additional frequency bands and/or GPS.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
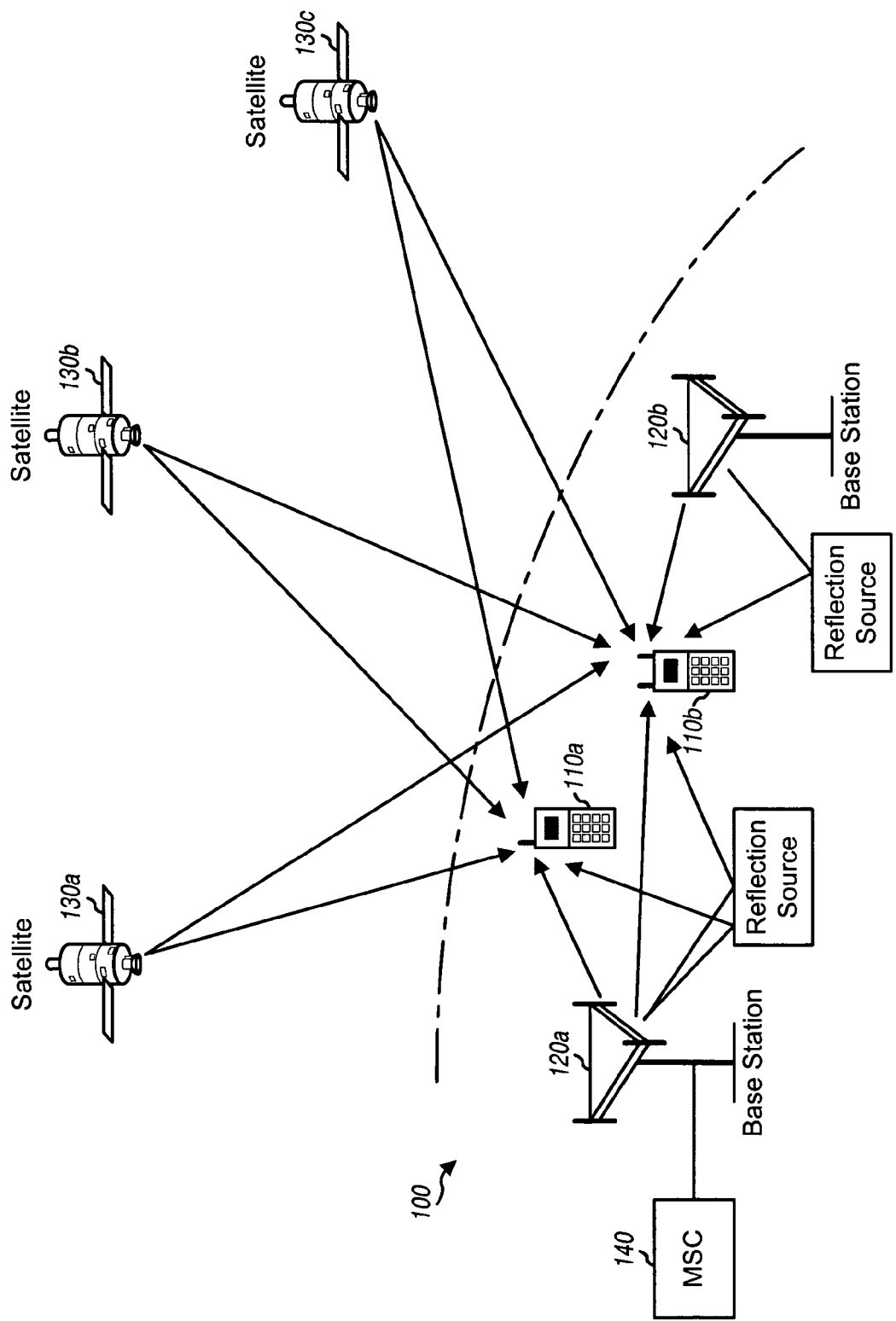
FIG. 1 shows a wireless communication system.

FIG. 1 shows a wireless communication system 100 in which a number of wireless terminals communicate with a number of base stations. For simplicity, only two terminals 110a and 110b and two base stations 120a and 120b are shown in FIG. 1. Each terminal 110 may receive signals from any number of transmitting sources at any given moment via line-of-sight paths and/or reflected paths. A reflected path is created when a transmitted signal reflects off a reflection source (e.g., a building, tree, or some other obstruction) and arrives at the terminal via a different path than the line-of-sight path. A terminal may also be referred to as a remote station, a mobile station, an access terminal, a user equipment (UE), a wireless communication device, a cellular phone, or some other terminology. Terminal 110a is equipped with a single antenna, and terminal 110b is equipped with two antennas. A base station is a fixed station and may also be referred to as an access point, a Node B, or some other terminology. A mobile switching center (MSC) 140 couples to the base stations and provides coordination and control for these base stations.

A terminal may or may not be capable of receiving signals from satellites 130. Satellites 130 may belong to a satellite positioning system such as the well-known Global Positioning System (GPS). Each GPS satellite transmits a GPS signal encoded with information that allows GPS receivers on earth to measure the time of arrival of the GPS signal. Measurements for a sufficient number of GPS satellites can be used to accurately estimate a three-dimensional position of a GPS receiver. A terminal may also be capable of receiving signals from other types of transmitting sources such as a Bluetooth transmitter, a wireless local area network (WLAN) transmitter, an IEEE 802.11 (Wi-Fi) transmitter, and so on.

In FIG. 1, each terminal 110 is shown as receiving signals from multiple transmitting sources simultaneously, where a transmitting source may be a base station or a satellite. In general, a terminal may receive signals from zero, one, or multiple transmitting sources at any given moment. For multi-antenna terminal 110b, the signal from each transmitting source is received by each of the multiple antennas at the terminal, albeit at different amplitudes and/or phases.

System 100 may be a Code Division Multiple Access (CDMA) system, a Time Division Multiple Access (TDMA) system, or some other wireless communication system. A CDMA system may implement one or more CDMA standards such as IS-95, IS-2000 (also commonly known as "1x"), IS-856 (also commonly known as "1xEV-DO"), Wideband-CDMA (W-CDMA), and so on. A TDMA system may implement one or more TDMA standards such as Global System for Mobile Communications (GSM). The W-CDMA standard is defined by a consortium known as 3GPP, and the IS-2000 and IS-856 standards are defined by a consortium known as 3GPP2. These standards are known in the art.

Low-power diversity receivers that can provide good performance are described herein. A diversity receiver is a receiver with at least two receive paths, with each receive path being capable of conditioning (e.g., amplifying and/or filtering) an RF signal and frequency downconverting the signal to baseband. The low-power diversity receivers may be used for terminals with a single antenna as well as terminals with multiple antennas. Some exemplary low-power diversity receivers are described below.

Figure 2:
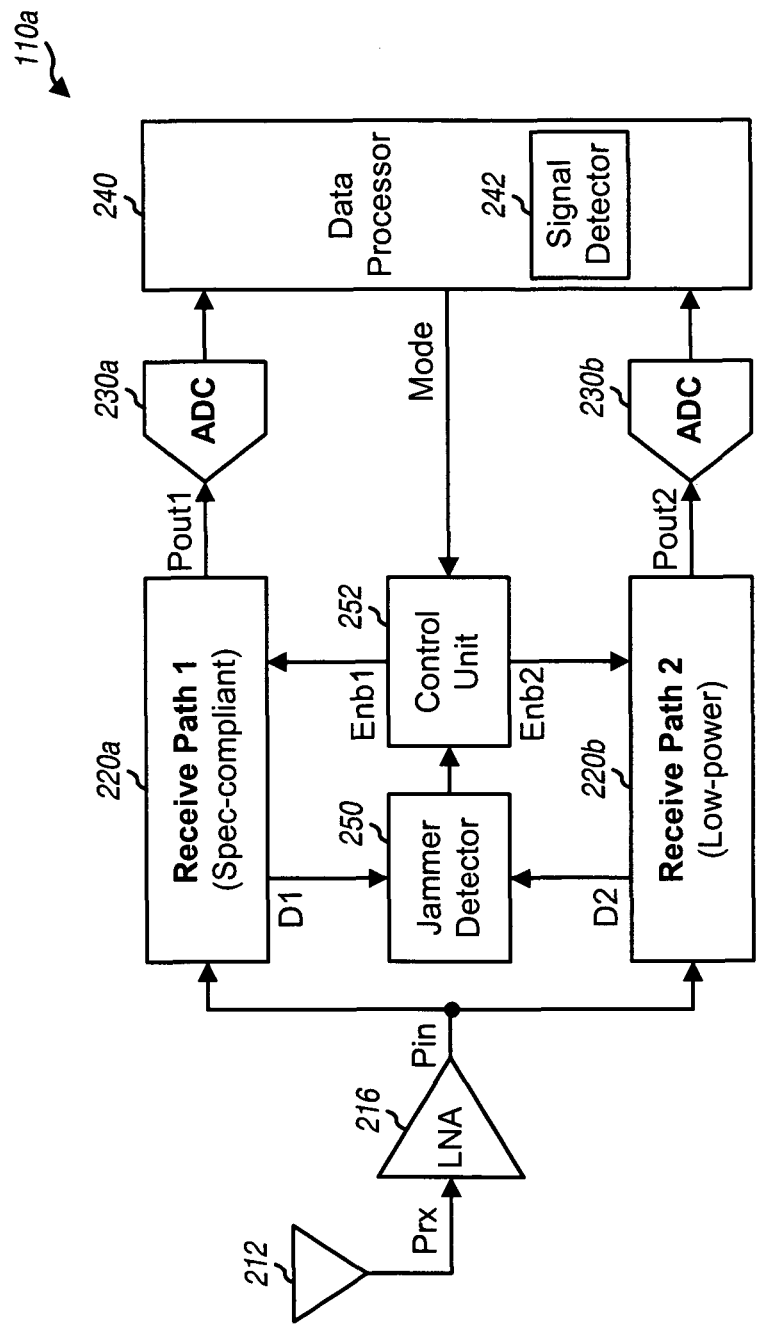
FIG. 2 shows a single-antenna terminal with two receive paths.

FIG. 2 shows a block diagram of an embodiment of single-antenna terminal 110a. In this embodiment, terminal 110a includes a single antenna 212 and two receive paths 220a and 220b. Antenna 212 receives RF modulated signals from base stations 120 and provides a received signal (Prx) that includes versions of the RF modulated signals transmitted by these base stations. A low noise amplifier (LNA) 216 performs low noise amplification on the received signal and provides an input signal (Pin) to both receive paths 220a and 220b. Receive path 220a is designated as the primary receive path, and receive path 220b is designated as the secondary receive path.

Each receive path 220 processes the input signal from LNA 216 and provides a respective output baseband signal. Receive path 220a is designed to meet applicable system requirements (e.g., for sensitivity, dynamic range, linearity, out-of-band rejection, and so on) and may be used for all operating conditions. Receive path 220b is designed for low power and with less stringent requirements and may be used for most operating conditions. Exemplary designs for receive paths 220a and 220b are described below.

An analog-to-digital converter (ADC) 230a receives and digitizes the first output baseband signal (Pout1) from receive path 220a and provides a first stream of data samples to a data processor 240 for further processing. Similarly, an ADC 230b receives and digitizes the second output baseband signal (Pout2) from receive path 220b and provides a second stream of data samples to data processor 240. Although not shown in FIG. 2 for simplicity, each output baseband signal and each data sample stream may be a complex signal/stream having an inphase (I) component and a quadrature (Q) component.

For the embodiment shown in FIG. 2, a signal detector 242 detects for the signal level of the desired signal, which is the signal within an RF channel of interest. The desired signal detection may be performed in various manners known in the art. For example, an automatic gain control (AGC) loop is typically used to adjust the gains of variable gain amplifiers (VGAs) located within the receive paths so that output baseband signals at the proper amplitude are provided to the ADCs. The gain control signals for these VGAs are indicative of, and may be mapped to, the desired signal level. A jammer detector 250 receives a first detector input signal (D1) from receive path 220a and a second detector input signal (D2) from receive path 220b, detects for the presence of large amplitude jammers in the received signal, and provides a jammer status signal indicating whether or not large amplitude jammers are present in the received signal. A control unit 252 receives the jammer status signal from jammer detector 250 and a Mode control signal from data processor 240 and provides the Enb1 and Enb2 signals used to enable receive paths 220a and 220b, respectively. For example, control unit 252 may select (1) receive path 220a if large amplitude jammers are detected in the received signal and (2) receive path 220b otherwise.

In one configuration, either receive path 220a or 220b is selected for use at any given moment, depending on the operating conditions. In another configuration, both receive paths 220a and 220b may be active at the same time to simultaneously process signals from two different systems. ADC 230b may be omitted, and a switch may be used to provide the output baseband signal from either receive path 220a or 220b to ADC 230a.

Figure 3:
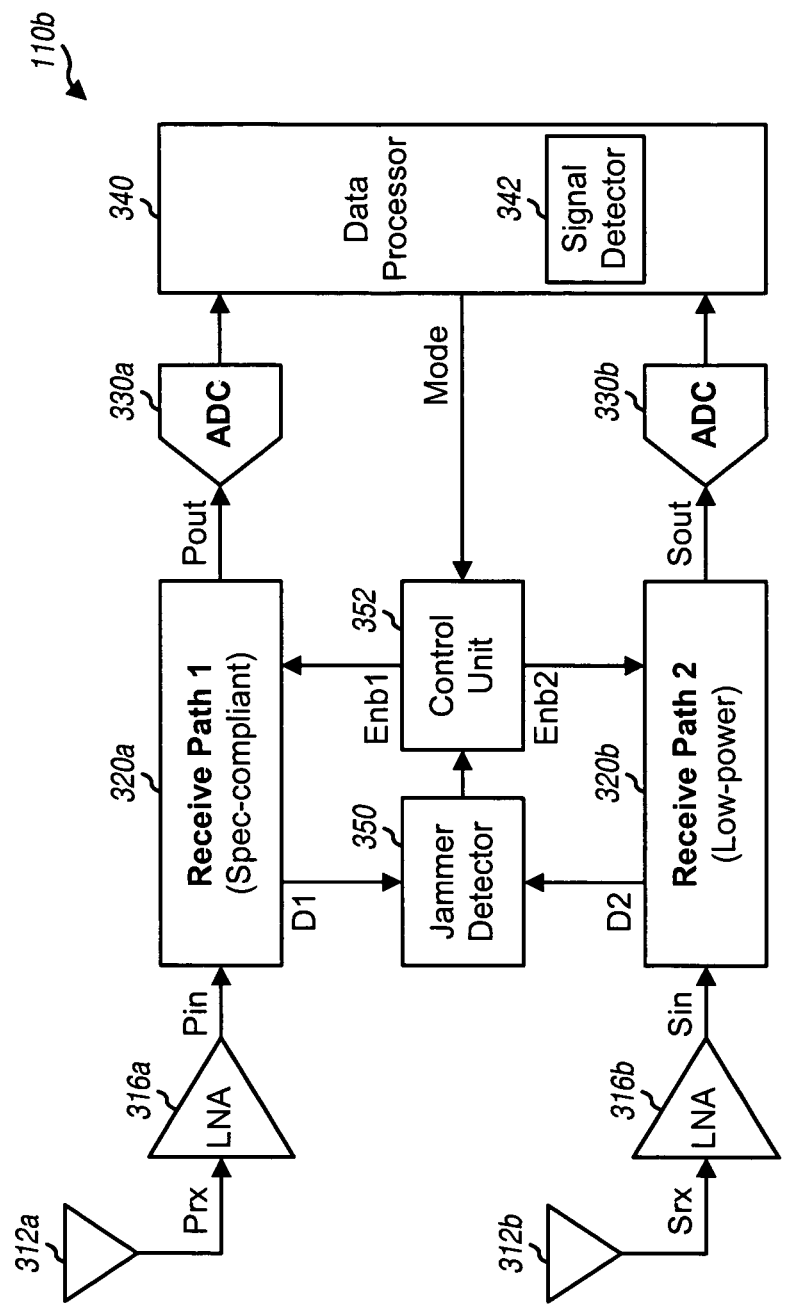
FIG. 3 shows a dual-antenna terminal with two receive paths.

FIG. 3 shows a block diagram of an embodiment of multi-antenna terminal 110b. In this embodiment, terminal 110b includes two antennas 312a and 312b and two receive paths 320a and 320b. The two antennas 312a and 312b may be formed in various manners at terminal 110b (e.g., with printed traces on a circuit board, wire conductors, and so on), as is known in the art. An LNA 316a amplifies a first received signal (Prx) from antenna 312a and provides a first input signal (Pin) to receive path 320a. Similarly, an LNA 316b amplifies a second received signal (Srx) from antenna 312b and provides a second input signal (Sin) to receive path 320b. Receive path 320a is designated as the primary receive path, and receive path 320b is designated as the secondary/diversity receive path. LNAs 316a and 316b may also be considered as part of receive paths 320a and 320b, respectively.

Each receive path 320 processes the input signal from one LNA 316 and provides a respective output baseband signal. Receive path 320a is designed to meet applicable system requirements and may be used for all operating conditions. Receive path 320b is designed for low power and with less stringent requirements and may be used for most operating conditions. In one configuration, either receive path 320a or 320b is selected for use at any given moment, depending on the operating conditions. In another configuration, both receive paths 320a and 320b are active at the same time to simultaneously process two received signals for the same wireless system in order to achieve diversity. In yet another configuration, both receive paths 320a and 320b simultaneously process signals for two different systems. Exemplary designs for receive paths 320a and 320b are described below.

ADC 330a receives and digitizes the first output baseband signal (Pout) from receive path 320a and provides a first data sample stream to a data processor 340. Similarly, an ADC 330b receives and digitizes the second output baseband signal (Sout) from receive path 320b and provides a second data sample stream to data processor 340. A signal detector 342 detects for the desired signal level. A jammer detector 350 detects for the presence of large amplitude jammers in the first and/or second received signal and provides a jammer status signal. A control unit 352 enables one or both receive paths 320a and 320b based on the jammer status signal from jammer detector 350 and the Mode control signal from data processor 340.

A wireless terminal may be a single-band terminal or a multi-band terminal. A single-band terminal supports operation on one specific frequency band. A multi-band terminal supports operation on multiple frequency bands and typically operates on one of the supported bands at any given moment. A multi-band terminal can communicate with different wireless communication systems operating on different frequency bands. Table 1 lists various frequency bands commonly used for wireless communication as well as the frequency band for GPS.

TABLE 1

| Frequency Band | Frequency Range |
|---|---|
| Personal Communication System (PCS) | 1850 to 1990 MHz |
| Cellular | 824 to 894 MHz |
| Digital Cellular System (DCS) | 1710 to 1880 MHz |
| GSM900 | 890 to 960 MHz |
| International Mobile Telecommunications-2000 (IMT-2000) | 1920 to 2170 MHz |
| CDMA450 | 411 to 493 MHz |
| JCDMA | 832 to 925 MHz |
| KPCS | 1750 to 1870 MHz |
| GPS | 1574.4 to 1576.4 MHz |

The PCS band is also known as GSM1900, the DCS band is also known as GSM1800, and the cellular band is also known as an Advanced Mobile Phone System (AMPS) band. A wireless communication system may also operate on a frequency band that is not listed in Table 1.

For each of the frequency bands listed in Table 1 except for GPS, one frequency range is used for the forward link (i.e., downlink) from the base stations to the terminals, and another frequency range is used for the reverse link (i.e., uplink) from the terminals to the base stations. As an example, for the cellular band, the 824 to 849 MHz range is used for the reverse link, and the 869 to 894 MHz range is used for the forward link.

Figure 4:
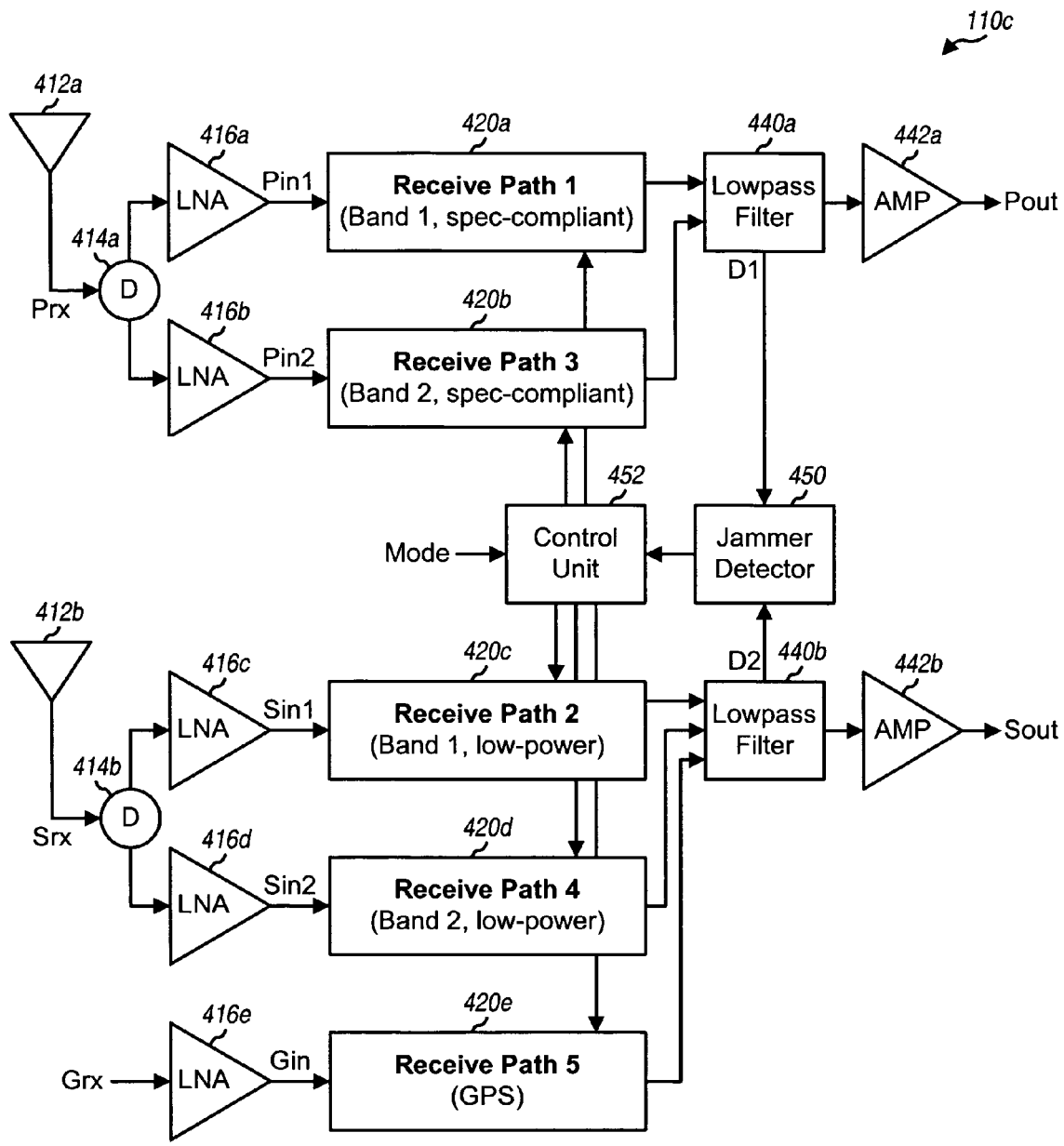
FIG. 4 shows a dual-antenna terminal with five receive paths for two frequency bands and GPS.

FIG. 4 shows a block diagram of an embodiment of dual-band plus GPS, multi-antenna terminal 110c (not shown in FIG. 1). Terminal 110c supports operation on two frequency bands, which for clarity are the cellular and PCS bands in the following description. In the embodiment shown in FIG. 4, terminal 110c includes two antennas 412a and 412b and five receive paths 420a through 420e. The received signal (Prx) from antenna 412a is provided to a diplexer 414a, which provides a first cellular signal to an LNA 416a and a first PCS signal to an LNA 416b. LNAs 416a and 416b perform low noise amplification on their signals and provide Pin1 and Pin2 input signals to receive paths 420a and 420b, respectively. Similarly, the received signal (Srx) from antenna 412b is provided to a diplexer 414b, which provides a second cellular signal to an LNA 416c and a second PCS signal to an LNA 416d. LNAs 416c and 416d perform low noise amplification on their signals and provide Sin1 and Sin2 input signals to receive paths 420c and 420d, respectively. An LNA 416e performs low noise amplification on a received GPS signal (Grx) and provides a Gin input signal to receive path 420e. LNAs 416a through 416e may also be considered as part of receive paths 420a through 420e, respectively.

Each receive path 420 conditions and frequency downconverts its input signal and provides a respective baseband signal. Receive paths 420a and 420b are designated as primary receive paths and are designed to meet applicable system requirements. Receive paths 420c and 420d are designated as secondary receive paths and are designed for low power and with less stringent requirements. Receive paths 420c and 420d may be implemented with circuit blocks that consume less power, occupy smaller area, and cost less than those of receive paths 420a and 420b.

For the embodiment shown in FIG. 4, receive paths 420a and 420b share baseband circuit blocks, and receive paths 420c, 420d, and 420e share baseband circuit blocks. A lowpass filter 440a filters the baseband signal from either receive path 420a or 420b and provides a first filtered baseband signal and the D1 detector input signal. A lowpass filter 440b filters the baseband signal from receive path 420c, 420d, or 420e and provides a second filtered baseband signal and the D2 detector input signal. Amplifiers 442a and 442b amplify and buffer the first and second filtered baseband signals and provide the first and second output baseband signals, Pout and Sout, respectively.

A jammer detector 450 receives the first and second detector input signals (D1 and D2) from lowpass filters 440a and 440b, respectively, detects for the presence of large amplitude jammers in the received signal, and provides the jammer status signal. A control unit 452 receives the jammer status signal and the Mode control signal and provides enable signals used to enable receive paths 420a through 420e. For example, control unit 452 may select (1) primary receive path 420a or 420b if large amplitude jammers are present, (2) secondary receive path 420c or 420d if large amplitude jammers are not present, (3) both receive paths 420a and 420c for the cellular band or both receive paths 420b and 420d for the PCS band, for the diversity mode, (4) receive path 420a or 420b for wireless communication and receive path 420e for GPS, and so on.

Receive paths 420a and 420c are designed for the cellular band, receive paths 420b and 420d are designed for the PCS band, and receive path 420e is designed for GPS frequency.

Receive paths 420*a* and 420*b* may be implemented with narrowband circuit blocks that are tuned to the cellular and PCS bands, respectively. Receive paths 420*c* and 420*d* may be implemented with narrowband and/or wideband circuit blocks to achieve the desired performance. For example, the circuit blocks in receive paths 420*c* and 420*d* may be implemented with resistors or low quality inductors, whereas the circuit blocks for receive paths 420*a* and 420*b* may be implemented with high quality inductors.

The primary receive paths (receive path 220*a* in FIG. 2, receive path 320*a* in FIG. 3, and receive paths 420*a* and 420*b* in FIG. 4) are designed to meet applicable system requirements. For CDMA, IS-98D and cdma2000 specify a two-tone test and a single-tone test. For the two-tone test, two tones (or jammers) are located at +900 KHz and +1700 KHz (or at −900 KHz and −1700 KHz) from the center frequency of a CDMA waveform and are 58 dB higher in amplitude than the CDMA signal level. For the single-tone test, a single tone is located at +900 KHz from the center frequency of the CDMA waveform and is 72 dB higher in amplitude than the CDMA signal level. These tests define the linearity and dynamic range requirements for the receive path. In most systems, jammers are present for only a small fraction of the time and rarely reach the +58 or +72 dB level as specified by IS-98D and cdma2000. Nevertheless, the primary receive paths may be designed to be IS-98D and cdma2000 compliant so that they can provide the specified performance for all operating conditions.

The secondary receive paths (receive path 220*b* in FIG. 2, receive path 320*b* in FIG. 3, and receive paths 420*c* and 420*d* in FIG. 4) are designed to be low-power and with less stringent requirements. For example, the secondary receive paths may be designed to meet dynamic range and sensitivity requirements, albeit assuming that large amplitude jammers are not present in the received signal. With the relaxed requirements, the secondary receive paths may be designed to consume only a fraction (e.g., 50% or 25%) of the power consumed by the corresponding primary receive paths. The secondary receive paths can still provide good performance most of the time since large amplitude jammers are present intermittently. The secondary receive paths can provide substantial power savings if they are used in place of the primary receive paths.

When not operating in the diversity mode, either the primary or secondary receive path is selected for use depending on one or more criteria. These criteria may include (1) presence or absence of large amplitude jammers in the received signal and (2) the desired signal level. Table 2 shows an embodiment for selecting receive path based solely on jammer detection.

TABLE 2

| Jammers | Receive Path |
| --- | --- |
| Present in the received signal | Primary receive path |
| Not present in the received signal | Secondary receive path |

Table 3 shows an embodiment for selecting receive path based on jammer detection and desired signal level.

TABLE 3

| Jammers | Desired Signal | Receive Path |
| --- | --- | --- |
| Present | Weak | Primary receive path |
| Present | Strong | Secondary or primary receive path depending on power level of jammer |
| Not present | Weak | Secondary receive path |
| Not present | Strong | Secondary receive path |

Large amplitude jammers may be deemed to be present in the received signal if their signal level exceeds a particular threshold, as described below. The desired signal may be deemed to be strong if it exceeds a particular signal level. This signal level may be dependent on the actual performance of the secondary path and may be circuit and implementation dependent. The selection of receive path may also be based on other criteria (e.g., received signal quality or signal-to-noise ratio (SNR), pilot received signal strength, power control bits, and so on), and this is within the scope of the invention.

A receive path may be implemented with a super-heterodyne architecture or a direct-to-baseband architecture. In the super-heterodyne architecture, the received signal is frequency downconverted in multiple stages, e.g., from RF to an intermediate frequency (IF) in one stage, and then from IF to baseband in another stage. In the direct-to-baseband architecture, the received signal is frequency downconverted from RF directly to baseband in one stage. The super-heterodyne and direct-to-baseband architectures may use different circuit blocks and/or have different circuit requirements.

Figure 5:
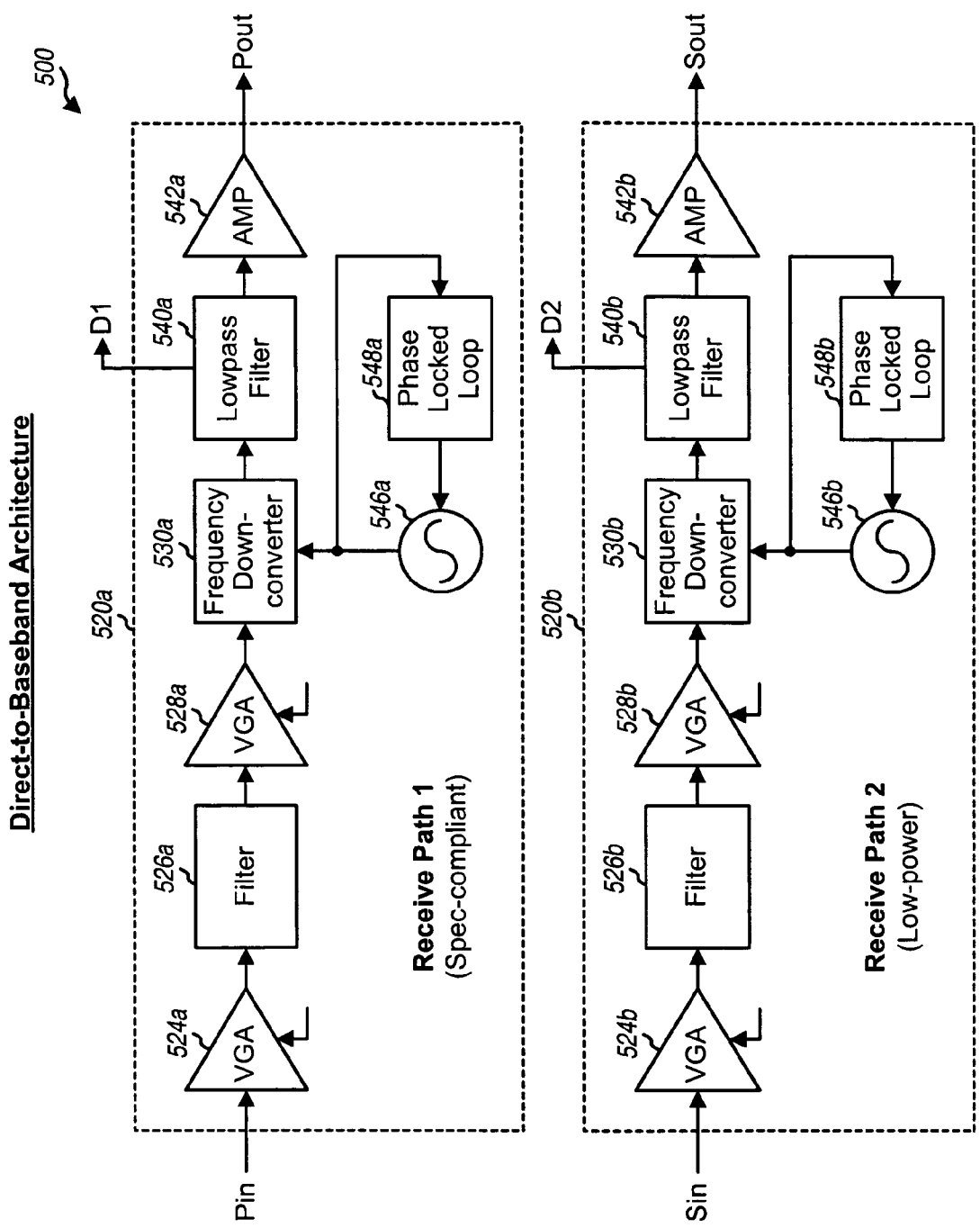
FIG. 5 shows a dual-path receiver with a direct-to-baseband architecture.

FIG. 5 shows a block diagram of a dual-path receiver 500, which implements the direct-to-baseband architecture and may be used for both single-antenna terminal 110*a* and multi-antenna terminal 110*b* in FIG. 1. Receiver 500 includes two receive paths 520*a* and 520*b* that may be used for receive paths 220*a* and 220*b*, respectively, in FIG. 2. In this case, both receive paths 520*a* and 520*b* are provided with the same input signal, Pin (not shown in FIG. 5). Receive paths 520*a* and 520*b* may also be used for receive paths 320*a* and 320*b*, respectively, in FIG. 3. In this case, receive paths 520*a* and 520*b* are provided with different input signals, Pin and Sin, respectively, as shown in FIG. 5. The RF portion of receive paths 520*a* and 520*b* may be used for receive paths 420*a* and 420*c*, respectively, and for receive paths 420*b* and 420*d*, respectively, in FIG. 4, as described below. Receive path 520*a* is the primary receive path, and receive path 520*b* is the secondary/diversity receive path.

Within receive path 520*a*, a VGA 524*a* amplifies the input signal (Pin) with a first variable gain (Gp1). A filter 526*a* filters the signal from VGA 524*a* to pass signal components in the band of interest and remove out-of-band noise and undesired signals. For two-way communication, signals are transmitted simultaneously on the forward link and reverse link. The transmitted signal sent by the terminal on the reverse link is typically much larger in amplitude than the received signal for the forward link. Filter 526*a* may pass the RF components for the receive frequency range (e.g., from 869 to 894 MHz for cellular band) and filter out and suppress the RF components for the transmit frequency range (e.g., from 824 to 849 MHz for the cellular band). Filter 526*a* may thus have a passband that corresponds to an entire frequency range/band of interest (e.g., cellular). Because of the potentially large difference in the transmit and receive signal levels, filter 526*a* needs to provide a large amount of out-of-band rejection in order to meet system requirements. Filter 526*a* may be implemented with a surface acoustic wave (SAW) filter (which has a sharp roll-off and is often used for applications requiring large attenuation of out-of-band signals), a ceramic filter, or some other type of filter.

A VGA 528a amplifies the signal from filter 526a with a second variable gain (Gp2) and provides a first conditioned signal having the desired signal level. VGAs 524a and 528a provide the required amplification for the Pin signal, which may vary by 90 dB or more. Additional gain may be provided by other circuit blocks in the receive path. A downconverter 530a receives and frequency downconverts the first conditioned signal with a first LO signal and provides a first baseband signal. The frequency of the first LO signal is selected such that the signal component in the RF channel of interest is downconverted to baseband or near-baseband. For CDMA, each frequency band covers many RF channels, and each RF channel has a bandwidth of 1.23 MHz. A wireless terminal typically receives signal on one RF channel at any given moment.

A lowpass filter 540a filters the first baseband signal to pass the signal components in the RF channel of interest and to remove noise and undesired signals that may be generated by the downconversion process. For the direct-to-baseband architecture, filter 526a may pass the entire frequency band of interest, and lowpass filter 540a would then pass the RF channel of interest. Lowpass filter 540a may be implemented with various filter types (e.g., Butterworth, elliptical, Chebychev, and so on), with the proper filter order and bandwidth, and with sufficient bias current to meet linearity and dynamic range requirements. Lowpass filter 540a provides a first filtered baseband signal and the D1 signal for the jammer detector. An amplifier 542a amplifies and buffers the first filtered baseband signal and provides the first output baseband signal (Pout).

An LO generator 546a provides the first LO signal used to downconvert the Pin signal from RF to baseband. LO generator 546a may be implemented with a voltage controlled oscillator (VCO) or some other type of oscillator. The frequency of the LO signal is selected such that the signal component in the RF channel of interest is downconverted to baseband or near-baseband. A phase locked loop (PLL) 548a receives the first LO signal and generates a control signal for LO generator 546a such that the frequency and/or phase of the first LO signal is locked to a reference signal (not shown in FIG. 5).

Receive path 520b processes the Sin signal and provides the second output baseband signal (Sout), in similar manner as receive path 520a. For each receive path, the frequency downconversion may be performed in various manners. For example, frequency downconversion may be performed by mixing the RF input signal down to baseband, as shown in FIG. 5. The frequency downconversion may also be performed by sampling or digitizing the RF input signal and using the aliasing property of data sampling to generate samples at baseband. Frequency downconverters 530a and 530b may be implemented with mixers, ADCs, mixer (e.g., for downconverter 530a) and ADC (e.g., for downconverter 530b), and so on. RF sampling may be more readily implemented on the secondary receive path 520b since the specifications are simpler.

FIG. 5 shows a specific design for receive paths 520a and 520b. In general, a receive path may perform signal conditioning using one or more stages of amplifier, filter, mixer, and so on, which may be arranged in a different manner from that shown in FIG. 5. Moreover, a receive path may employ other circuit blocks not shown in FIG. 5 for signal conditioning.

FIG. 5 shows receive paths 520a and 520b having the same circuit blocks. However, different circuit designs may be used for the circuit blocks in receive paths 520a and 520b because of the different requirements and objectives for the primary and secondary receive paths.

Receive path 520a is designed to meet applicable system requirements, e.g., linearity, dynamic range, and sensitivity requirements. To achieve this, the RF circuit blocks in receive path 520a are typically narrowband circuits tuned to a specific frequency band (e.g., cellular or PCS band). For example, VGAs 524a and 528a and downconverter 530a may be implemented with narrowband circuits to achieve the desired linearity over a wide dynamic range. The narrowband circuit blocks may use matching and tuned circuits, inductive degeneration, and other circuit techniques known in the art to achieve the desired performance. Lowpass filter 540a may be designed with a relatively sharp roll-off (e.g., as a 5-th order elliptical filter) in order to attenuate large amplitude jammers in the input signal. These jammers can take up a large portion of the dynamic range of the subsequent ADC if they are not sufficiently filtered. LO generator 546a is designed to have good phase noise performance. In general, good performance for the circuit blocks within receive path 520a typically requires the use of larger-size circuit components (e.g., larger capacitors, inductors and/or transistors) and large amounts of bias current.

Receive path 520b is designed for low-power and with less stringent requirements, which assumes that large amplitude jammers are not present in the received signal. Because of the less stringent requirements, VGAs 524b and 528b, downconverter 530b, filter 540b, and amplifier 542b may be designed with smaller-size circuit components (e.g., smaller capacitors) and smaller amounts of bias current. VGAs 524b and 528b and downconverter 530b may be implemented without using inductors (which typically occupy a large area) or by using inductors of lower quality (which can occupy a smaller area). Filter 526b may be implemented with on-chip circuit components instead of an external SAW filter (which may be needed for filter 526a). Because large amplitude jammers are assumed to be absent for receive path 520b, the overall gain may be distributed differently for the secondary receive path in a manner to further reduce power consumption, area, and cost. Lowpass filter 540b may be implemented with a lower order (e.g., as a 3-rd order elliptical filter) than lowpass filter 540a. Using these various circuit design techniques, receive path 520b may be designed to consume only a fraction (e.g., 50% or 25%) of the power and occupy only a small fraction of the area required by receive path 520a.

Figure 6:
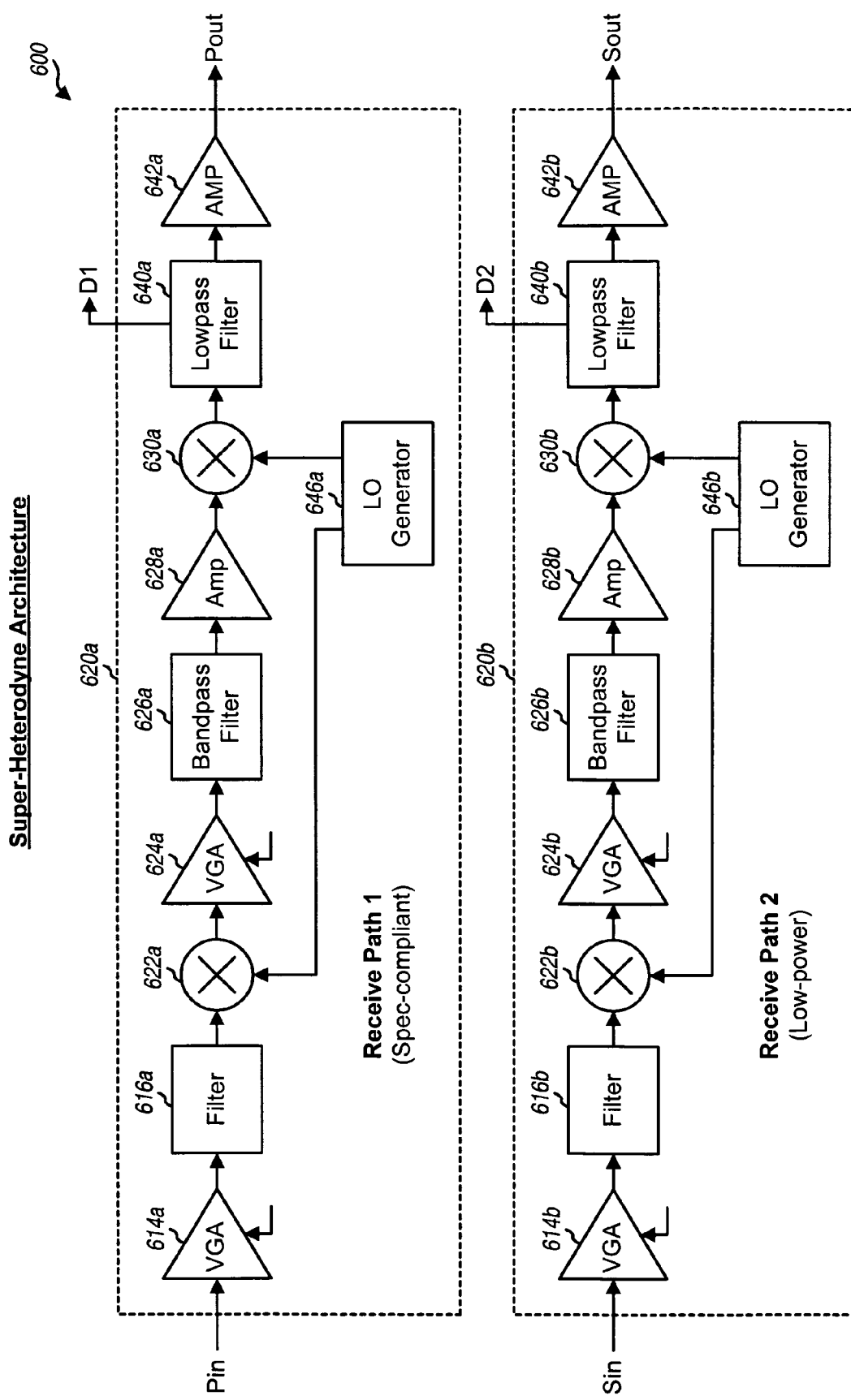
FIG. 6 shows a dual-path receiver with a super-heterodyne architecture.

FIG. 6 shows a block diagram of a dual-path receiver 600, which implements the super-heterodyne architecture and may also be used for both single-antenna terminal 110a and multi-antenna terminal 110b. Receiver 600 includes two receive paths 620a and 620b that may be used for receive paths 220a and 220b, respectively, in FIG. 2, and for receive paths 320a and 320b, respectively, in FIG. 3. The RF portion of receive paths 620a and 620b may be used for receive paths 420a and 420c, respectively, and for receive paths 420b and 420d, respectively, in FIG. 4.

Within receive path 620a, the input signal (Pin) is amplified by a VGA 614a, filtered by a filter 616a, and downconverted from RF to IF by a frequency downconverter 622a. The IF signal from downconverter 622a is further amplified by a VGA 624a, filtered by a bandpass filter 626a, amplified and buffered by an amplifier 628a, and downconverted from IF to baseband by a frequency downconverter 630a. The baseband signal from downconverter 630a is filtered by a lowpass filter 640a and amplified and buffered by an amplifier 642a to obtain the first output baseband signal (Pout).

For the super-heterodyne architecture, bandpass filter 626a may be implemented with a SAW filter and may perform RF channel selection (i.e., may have a passband corresponding to one RF channel, instead of an entire frequency band). If the RF channel selection is performed by bandpass filter 626a, then the requirements for lowpass filter 640a may be relaxed.

An LO generator 646a provides a first LO signal used for RF to IF downconversion and a second LO signal used for IF to baseband downconversion. Typically, the IF is fixed, the frequency of the first LO signal is selected such that the signal component in the RF channel of interest is downconverted to the fixed IF, and the frequency of the second LO signal is also fixed.

Receive path 620b processes the Sin signal and provides the second output baseband signal (Sout), in similar manner as receive path 620a. Receive path 620b may be implemented with circuit blocks that consume less power, occupy smaller area, and are lower cost than those of receive path 620a.

Referring back to FIG. 4, receive paths 420a through 420e may be implemented with the direct-to-baseband architecture or the super-heterodyne architecture. For the direct-to-baseband architecture, each of receive paths 420a through 420e may be implemented with VGAs 524 and 528, filter 526, and frequency downconverter 530 in FIG. 5. For the super-heterodyne architecture, each of receive paths 420a through 420e may be implemented with VGAs 614 and 624, amplifier 628, filters 616 and 626, and frequency downconverters 622 and 630 in FIG. 6.

Two LO generators operating independently, as shown in FIGS. 5 and 6, may be used for the primary and secondary receive paths. This design allows the primary and secondary receive paths to operate simultaneously and independently to process two signals on two different RF channels. This capability may be useful for various applications. For example, a terminal with this capability can receive two simultaneous transmissions on two RF channels from one or two systems. As another example, a terminal with this capability can perform mobile-assisted hand-off (MAHO) to select the best base stations to communicate with. The terminal can receive a transmission from a serving base station with the primary receive path and can simultaneously search for signals from other base stations with the secondary receive path. This would then allow the terminal to initiate a hand-off to another base station that is better than the serving base station, if one is found. If independent operation of the primary and secondary receive paths is not needed, then one LO generator may be shared by both receive paths.

Although not indicated in FIGS. 2 through 6 for simplicity, the primary receive paths (receive path 220a in FIG. 2, receive path 320a in FIG. 3, receive paths 420a and 420b in FIG. 4, receive path 520a in FIG. 5, and receive path 620a in FIG. 6) may be designed with multiple power modes, e.g., a high power mode and a low power mode. In the high power mode, the circuit blocks (e.g., amplifiers, mixers, and so on) within the primary receive paths may be biased with high current to meet applicable system requirements under the worst-case operating condition, such as those specified by IS-98D or cdma2000. In the low power mode, the circuit blocks within the primary receive paths may be biased with less current that can still meet applicable system requirements under more moderate operating condition, e.g., with no jammers or low amplitude jammers. The primary receive paths may also be designed with more than two power modes, with more current being used for more severe operating condition.

Many wireless systems have an open loop transmit power specification that dictates the amount of transmit power to use at the start of a transmission based on the received power level. A terminal typically does not know the transmit power level needed for reliable communication when the terminal is first powered on or first starts to transmit. In this case, the forward and reverse links may be assumed to be reciprocal of one another, i.e., the path loss for the reverse link is assumed to be equal to the path loss for the forward link. The terminal can estimate the path loss for the forward link based on a pilot received from a base station and can determine the amount of transmit power to use for the reverse link transmission based on the forward link measurement. However, if the terminal is equipped with multiple antennas, then the received power level may change abruptly when different antennas are selected for use. This open loop power disturbance may result in the wrong transmit power level being used for the reverse link transmission.

Figure 7:
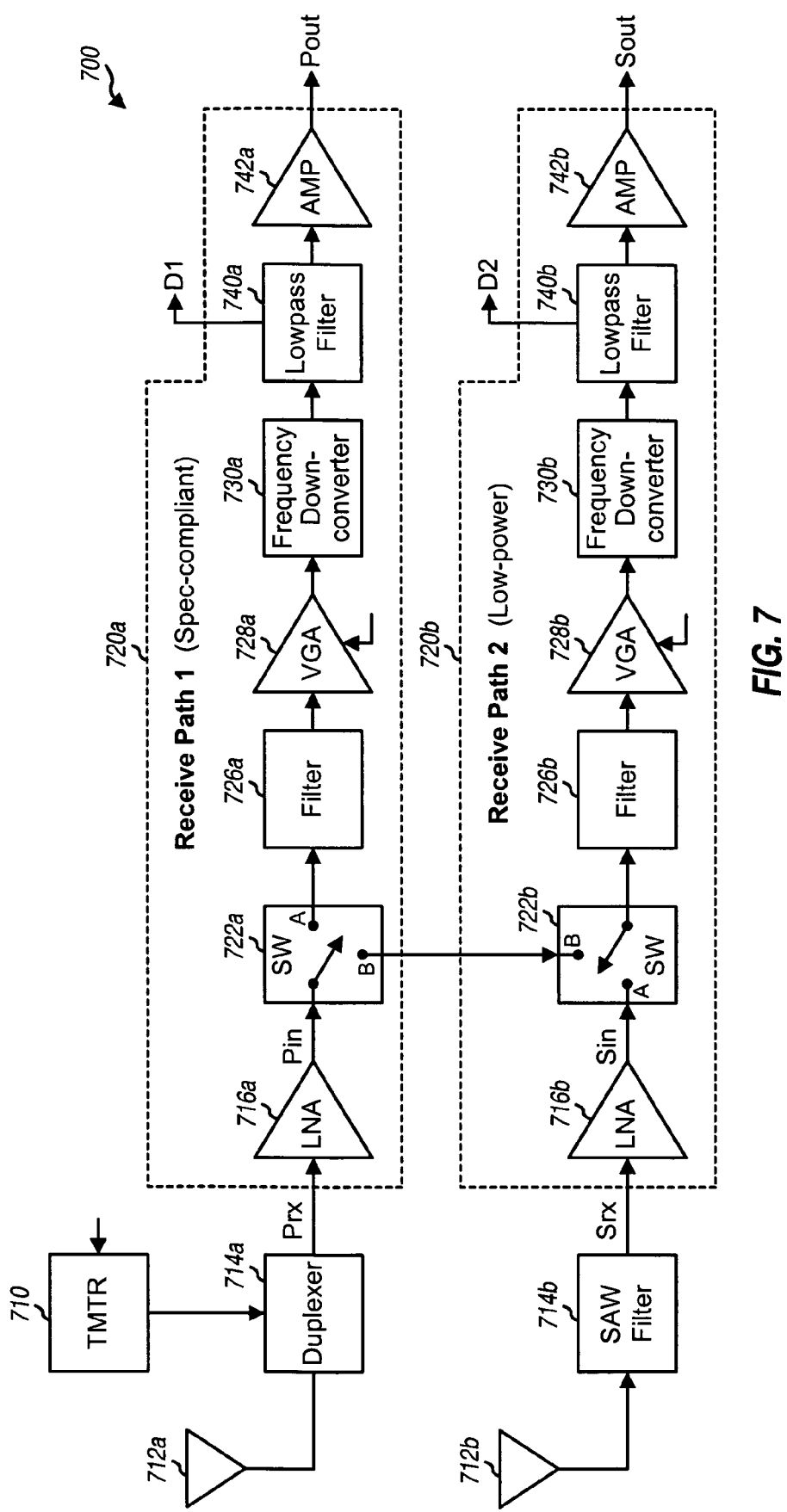
FIGS. 7 and 8 show two dual-path receivers that may also be used for the dual-antenna terminal in FIG. 3.

FIG. 7 shows a block diagram of a dual-path receiver 700 that may be used for dual-antenna terminal 110b in FIG. 3. Receiver 700 includes two receive paths 720a and 720b. Receive path 720a is the primary receive path and couples to a duplexer 714a, which further couples to a transmitter unit (TMTR) 710 and an antenna 712a. Duplexer 714a routes the transmit signal from transmitter unit 710 to antenna 712a and further routes the received signal from antenna 712a to receive path 720a. Receive path 720b is the secondary receive path and couples to a SAW filter 714b, which further couples to an antenna 712b. For this embodiment, the terminal only transmits from antenna 712a and not antenna 712b. Antenna 712a may be a whip/dipole antenna or some other type of antenna. Antenna 712b may be an internal antenna, a printed antenna, or some other type of antenna.

Receive path 720a includes an LNA 716a, a switch 722a, a filter 726a, a VGA 728a, a frequency downconverter 730a, a lowpass filter 740a, and an amplifier 742a, all of which function as described above for FIGS. 2 through 6. Receive path 720b includes the same circuit blocks as receive path 720a. The circuit blocks for receive path 720a may be designed and biased to be spec-compliant, and the circuit blocks for receive path 720b may be designed and biased for low power. The circuit blocks for receive path 720a may also be designed with multiple power modes, as described above.

In a first operating mode, both receive paths 720a and 720b are selected for use to achieve diversity. For this mode, switches 722a and 722b are both switched to the "A" position and pass the output of LNAs 716a and 716b, respectively, to filters 726a and 726b, respectively. If diversity is not needed, then either receive path 720a or 720b may be selected for use depending on the operating condition. In a second operating mode, receive path 720a is selected for use if large amplitude jammers are detected. For this mode, switch 722a is switched to the "A" position, and the entire receive path 720b may be powered down. In a third operating mode, receive path 720b is selected for use if no jammers or low amplitude jammers are detected. For this mode, switches 722a and 722b are both switched to the "B" position, and the output of LNA 716a is routed to filter 726b. LNA 716b in receive path 720b and all of the circuit blocks after switch 722a in receive path 720a may be powered down. LNA 716a may also be biased with less current to conserve power. For all three operating modes, the received signal power can be measured from antenna 712a. The overall gain from switch 722 to amplifier 742 may be determined for each receive path and used to account for the received signal power measurements. Switches 722a and 722b can mitigate open loop power disturbance.

Figure 8:
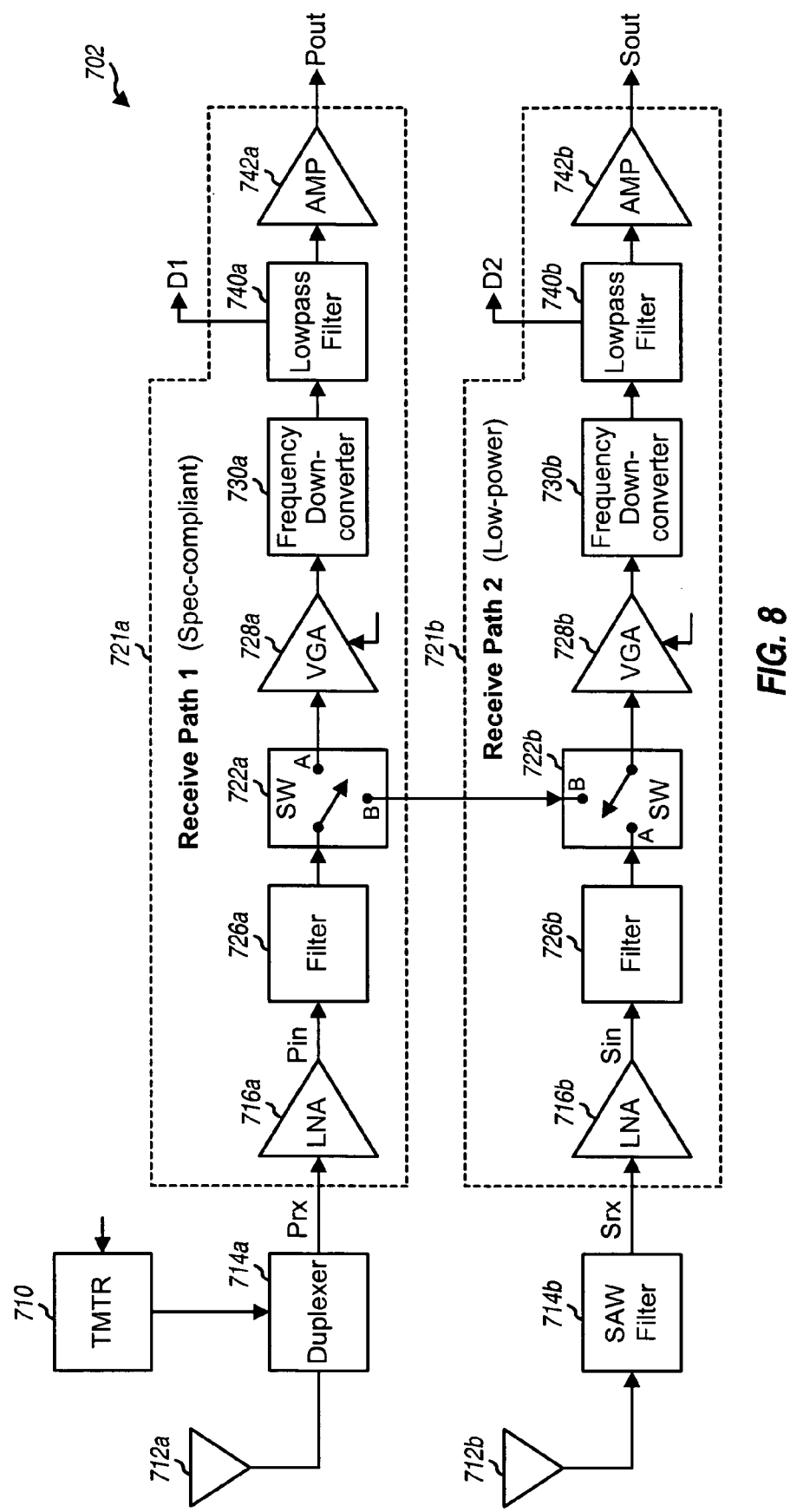

FIG. 8 shows a block diagram of a dual-path receiver 702 that may also be used for dual-antenna terminal 110b in FIG. 3. Receiver 702 includes two receive paths 721a and 721b. Each receive path 721 includes all of the circuit blocks in receive path 720 in FIG. 7. However, switches 722a and 722b are placed after filters 726a and 726b, respectively, in receive paths 721a and 721b, respectively. If filter 726a has better electrical characteristics than filter 726b, then improved performance may be obtained by using filter 726*a* instead of filter 726*b*. In general, switch 722*a* may be located anywhere within receive path 721*a*, and switch 722*b* may be located anywhere within receive path 721*b*.

Figure 9:
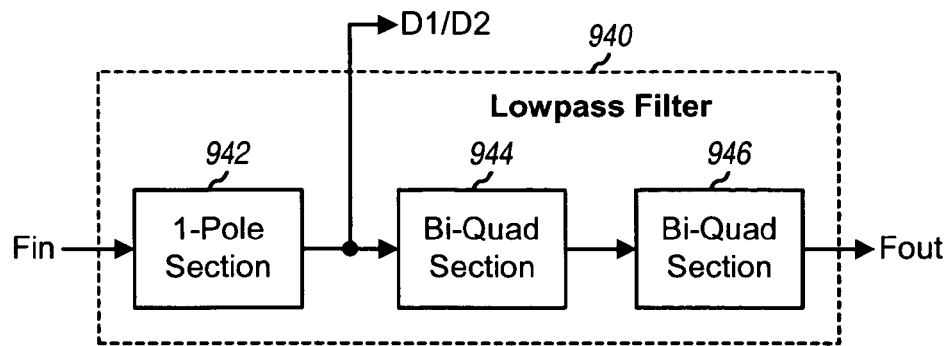
FIG. 9 shows a lowpass filter.

FIG. 9 shows an embodiment of a lowpass filter 940, which may be used for each of the lowpass filters shown in FIGS. 4, 5 and 6. Lowpass filter 940 includes a single-pole filter section 942 and bi-quad filter sections 944 and 946. Single-pole filter section 942 implements one real pole. Each of bi-quad filter sections 944 and 946 implements a pair of complex poles. A 5-th order (e.g., elliptical, Butterworth, Bessel, or Chebychev) filter may be implemented with all three filter sections 942, 944, and 946.

The lowpass filters for the receive paths may also be implemented with other filter designs. Furthermore, the lowpass filters for the primary and secondary receive paths may be implemented with the same or different filter designs. For example, a 5-th order lowpass filter may be used for the primary receive path, and a 3-rd order lowpass filter may be used for the secondary receive path.

As noted above, when not operating in the diversity mode, either the primary or secondary receive path for the desired frequency band is selected for use depending on whether or not jammers are detected in the received signal. Jammers are large amplitude, undesired out-of-band signals that can distort the desired in-band signal. The detector input signals used for jammer detection may be obtained from various points along the receive path but should include out-of-band signal components. The detector input signals may be broadband signals with a flat frequency response that gives equal weight to signal components at different frequencies. However, jammers that are closer in-band (i.e., closer to the desired RF channel) tend to be more detrimental to the desired signal than jammers that are farther away in frequency. Thus, the detector input signals may be rolled off (e.g., with a first-order lowpass filter response) to allow for discrimination of the frequency offset of the jammers. This would then give jammers closer in more weight and jammers farther away less weight.

For the embodiments shown in FIGS. 4, 5 and 6, the lowpass filters also provide the detector input signals (D1 and D2) used to detect for the presence of jammers in the received signals. In an embodiment, the detector input signals are taken after single-pole filter section 942 in the lowpass filters.

Figure 10:
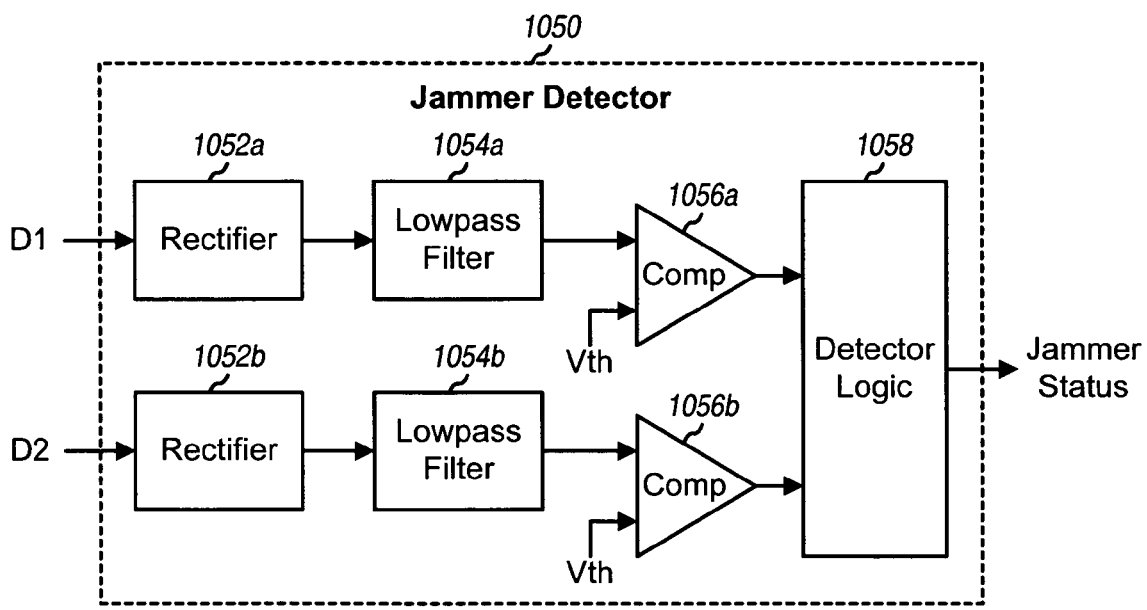
FIG. 10 shows a jammer detector.

FIG. 10 shows a block diagram of a jammer detector 1050, which may be used for the jammer detectors in FIGS. 2, 3 and 4. The D1 and D2 signals for the primary and secondary receive paths are rectified by rectifiers 1052*a* and 1052*b*, filtered by lowpass filters 1054*a* and 1054*b*, and provided to comparators 1056*a* and 1056*b*, respectively. Each rectifier 1052 converts its detector input signal from a sinusoidal signal (with positive and negative amplitude) to a single-ended signal (with only positive amplitude) and may be implemented with a diode. Each lowpass filter 1054 may be implemented, for example, with a single-order lowpass filter of an appropriate bandwidth (e.g., several hundred Hertz). Each comparator 1056 compares its filtered signal against a threshold level (Vth) and provides an output signal, which is (1) logic high ('1') if the filtered signal amplitude is larger than the threshold level, indicating the presence of large amplitude jammers in the received signal, and (2) logic low ('0') otherwise. Detector logic 1058 combines the output signals of comparators 1056*a* and 1056*b* and provides the jammer status signal to control unit 252, 352, or 452.

In general, jammer detection may be performed based on (1) only the D1 signal, (2) only the D2 signal, or (3) both the D1 and D2 signals. The filtered signals from lowpass filters 1054*a* and 1054*b* may be compared against the threshold level as shown in FIG. 10 to obtain a 1-bit output signal. These filtered signals may also be digitized with an ADC to obtain multiple bits of resolution. The jammer status signal may be used to select either the primary or secondary receive path. The jammer status signal may also be used to adjust (e.g., the gains and/or bias currents of) the circuit blocks in the primary and/or secondary receive paths.

Figure 11:
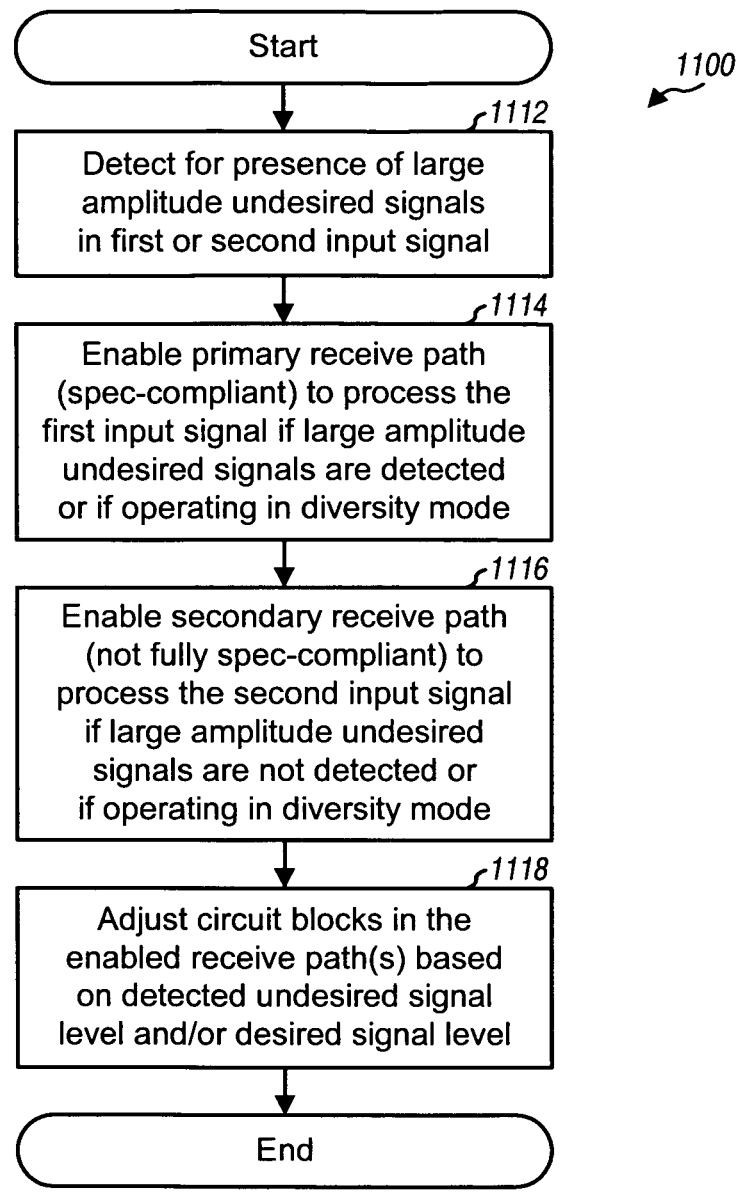
FIG. 11 shows a process for operating two receive paths in a wireless terminal.

FIG. 11 shows a flow diagram of a process 1100 for operating two receive paths in a wireless terminal. The presence of large amplitude jammers in a first input signal or a second input signal is detected (block 1112). The first and second input signals may be from (1) one antenna for a single-antenna terminal or (2) two antennas for a multi-antenna terminal. The primary receive path (which is spec-compliant, e.g., IS-98D compliant) is enabled to process the first input signal if large amplitude jammers are detected (block 1114). The secondary receive path (which is not fully spec-compliant) is enabled to process the second input signal if large amplitude jammers are not detected (block 1116). The primary and secondary receive paths are both enabled if the multi-antenna terminal is operating in a diversity mode and the received signals from both antennas are to be processed simultaneously. Electrical characteristics (e.g., gains, bias currents, and so on) of the circuit blocks in the enabled receive path(s) may also be adjusted based on the detected jammer signal level and/or the desired signal level (block 1118).

The low-power diversity receiver described herein can provide good performance for both single-antenna and multi-antenna terminals under most operating conditions. The worst-case operating condition occurs when (1) the desired signal is near "sensitivity", which is the lowest detectable received signal level, and (2) the jammers are at maximum signal level and located at a small frequency offset away from the desired signal. This worst-case condition is a low probability event. For the single-antenna terminal, the low-power secondary receive path may be used for most operating conditions. For the multi-antenna terminal, the diversity mode is typically needed for only 20 to 50 percent of the time. For the remaining 50 to 80 percent of the time, a single receive path may be used, and the secondary receive path may be selected if large amplitude jammers are not detected. For both single-antenna and multi-antenna terminals that are portable, the secondary receive path consumes less power and improves both standby time between battery recharges and talk time.

The low-power diversity receiver described herein may be used for a wireless terminal to receive forward link transmissions from base stations. The low-power diversity receiver may also be used for a base station to receive reverse link transmissions from user terminals.

The low-power diversity receiver described herein may be used for various wireless communication systems such as a CDMA system, a TDMA system, a GSM system, an AMPS system, a multiple-input multiple-output (MIMO) system, an orthogonal frequency division multiplexing (OFDM) system, an orthogonal frequency division multiple access (OFDMA) system, a wireless local area network, and so on.

A large portion of a diversity receiver (possibly all circuit blocks except SAW filters, control units 252, 352, and 452, and data processors 240 and 340) may be implemented on one or more RF integrated circuits (RFICs). The diversity receiver may also be fabricated with various IC process technologies such as complementary metal oxide semiconductor (CMOS), bipolar junction transistor (BJT), bipolar-CMOS (BiCMOS), silicon germanium (SiGe), gallium arsenide (GaAs), and so on.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A multi-antenna wireless diversity receiver comprising:
a first receive path having a first amplifier and a first frequency downconverter, operable to receive, amplify, and frequency downconvert a first multipath of a desired signal to provide a first baseband signal, the first receive path having circuit blocks using high power for high system performance; and
a second receive path having a second amplifier and a second frequency downconverter, operable to receive, amplify, and frequency downconvert a second multipath of the desired signal to provide a second baseband signal, the second receive path implemented with circuit blocks that inherently consume less power than the circuit blocks of the first receive path, the first and second receive paths are interdependently alternatively enabled based directly on a detected presence of jammer signals out-of-band and independently associated with at least one of the first multipath signal and the second multipath signal.

2. The device of claim 1, wherein the first and second receive paths concurrently process the first and second input signals, respectively, for diversity mode.

3. The device of claim 1, wherein the first and second receive paths are coupled to first and second antennas, respectively, and wherein the device is operable to measure signal power of a received signal from the first antenna regardless of whether the first or second receive path is selected for use.

4. The device of claim 1, further comprising:
a detector operative to detect for the presence of a large amplitude of the jammer signals in the first or second multipath signal; and
a control unit operative to select the first receive path for use if a large amplitude of the jammer signals are detected and to select the second receive path for use if the large amplitude of the jammer signals are not detected.

5. The device of claim 4, wherein the detector is operative to detect for the presence of the large amplitude jammer signals based on a detector input signal.

6. The device of claim 5, wherein signal components in the detector input signal with larger frequency offsets from a desired signal are attenuated relative to signal components with smaller frequency offsets from the desired signal.

7. The device of claim 6, wherein the signal components in the detector input signal are attenuated by a first-order low pass filter response.

8. The device of claim 1, further comprising:
a first detector operative to detect for presence of a large amplitude of the jammer signals in the first or second multipath signal;
a second detector operative to detect for a signal level of a desired signal in the first or second multipath signal; and
a control unit operative to select the first or second receive path for use based on outputs of the first and second detectors.

9. The device of claim 1, wherein the first and second receive paths are operable to downconvert the first and second multipath signals directly from radio frequency (RF) to baseband.

10. The device of claim 1, wherein the first receive path is operable in one of multiple power modes, each power mode corresponding to different amounts of bias current for circuit blocks within the first receive path.

11. The device of claim 10, wherein the first receive path is operable in a low power mode if jammers are not detected or have low amplitude.

12. The device of claim 1, wherein power consumption of the second receive path is less than fifty percent of power consumption of the first receive path.

13. The device of claim 1, wherein power consumption of the second receive path is less than power consumption of the first receive path.

14. A device including a wireless diversity receiver characterized by a first and second receive path circuits each operable to downconvert a desired signal transmitted from a common source and received by at least two antennas, the second receive path implemented with circuit blocks that inherently consume less power than the circuit blocks of the first receive path, the first and second receive path circuits are interdependently alternatively enabled based directly on a detected presence of jammer signals out-of-band and independently associated with at least one of the first multipath signal and the second multipath signal.

15. The device of claim 14, wherein the first and second receive path units are selectably enabled by a control unit based on whether or not jammers may be present or have low amplitude.

16. The device of claim 14, wherein power consumption of the second receive path circuit is less than fifty percent of power consumption of the first receive path circuit.

17. The device of claim 14, wherein the device is an integrated circuit.

18. The device of claim 14, wherein the device is a mobile device.

19. A device including a wireless diversity receiver characterized by a first and second receive path circuits each operable to downconvert a desired signal transmitted from a common source and received by at least two antennas, the second receive path implemented with circuit blocks that inherently consume less power than the circuit blocks of the first receive path, the device further comprising:
a detector to detect the presence of large amplitude jammer signals in the desired signal; and
a control unit to enable the first and second receive path circuits, the first and second receive path circuits are interdependently alternatively enabled based directly on a detected presence of jammer signals out-of-band and independently associated with at least one of the first multipath signal and the second multipath signal.

20. The device of claim 19, wherein the detector determines when jammers are not present or have low amplitude.

21. The device of claim 19, wherein power consumption of the second receive path circuit is less than fifty percent of power consumption of the first receive path circuit.

22. The device of claim 19, wherein the device is an integrated circuit.

23. The device of claim 19, wherein the device is a mobile device.

24. In a device configured for diversity mode operation and including at least two antennas and characterized by at least a first receive path circuit having high power circuit blocks and a second receive path circuit having low power circuit blocks, a method to downconvert a desired signal transmitted from a transmit antenna and received by the least one antenna, comprising:

identifying, by a control unit, when a signal level of the desired signal is such that it can be processed by low circuit blocks, the second receive path implemented with circuit blocks that inherently consume less power than the circuit blocks of the first receive path, the first and second receive paths are interdependently alternatively enabled based directly on a detected presence of jammer signals out-of-band and independently associated with at least one of the first multipath signal and the second multipath signal;

downconverting, by the second receive path circuit, the desired signal using low power circuit blocks in response to being enabled by the control unit; and downconverting, by the first receive path circuit, the desired signal using high power circuit blocks in response to being enabled by the control unit.

25. The method of claim 24, further comprising receiving enable signals from the control unit based on whether or not jammers may be present or have low amplitude.

26. The method of claim 24, wherein power consumption of the second receive path circuit is less than fifty percent of power consumption of the first receive path circuit.

27. The method of claim 24, wherein the device is an integrated circuit.

28. The method of claim 24, wherein the device is a mobile device.

29. A device configured for diversity mode operation and characterized by a first receive path means and second receive path means for downconverting a desired signal, transmitted from a common source to at least two antennas, in low power mode and in high power mode, respectively, the device further comprising:

means for identifying when a signal level of the desired signal is above a desired level, the second receive path implemented with circuit blocks that inherently consume less power than the circuit blocks of the first receive path, the first and second receive path means are interdependently alternatively enabled based directly on a detected presence of jammer signals out-of-band and independently associated with at least one of the first multipath signal and the second multipath signal;

means for downconverting, by the second receive path means, the desired signal using low power in response to being enabled by the means for identifying; and means for downconverting, by the first receive path means, the desired signal using high power circuit blocks in response to being enabled by the control unit.

30. The device of claim 29, further comprising means for processing a different multipath of the desired signal concurrently at least when the signal level is not below the desired level.

31. The device of claim 29, further comprising means for generating enable signals to the first and second receive path means based on whether or not jammers may be present or have low amplitude.

32. The device of claim 29, wherein power consumption of the second receive path means is less than fifty percent of power consumption of the first receive path means.

33. The device of claim 29, wherein the device is an integrated circuit.

34. The device of claim 29, wherein the device is a mobile device.

* * * * *